(12) United States Patent
Padmanabhan

(10) Patent No.: US 11,770,445 B2
(45) Date of Patent: *Sep. 26, 2023

(54) DECENTRALIZED INFORMATION MANAGEMENT DATABASE SYSTEM

(71) Applicant: Salesforce, Inc., San Francisco, CA (US)

(72) Inventor: Prithvi Krishnan Padmanabhan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,865

(22) Filed: Jan. 25, 2022

(65) Prior Publication Data

US 2023/0239348 A1 Jul. 27, 2023

(51) Int. Cl.
*H04L 67/1074* (2022.01)
*H04L 9/32* (2006.01)
*H04L 9/00* (2022.01)

(52) U.S. Cl.
CPC ........ *H04L 67/1074* (2013.01); *H04L 9/3213* (2013.01); *H04L 9/50* (2022.05); *H04L 2209/56* (2013.01); *H04L 2209/603* (2013.01)

(58) Field of Classification Search
CPC ..... H04L 67/1074; H04L 9/3213; H04L 9/50; H04L 2209/56; H04L 2209/603
See application file for complete search history.

(56) References Cited

U.S. PATENT DOCUMENTS

| 10,585,657 B2 | 3/2020 | Padmanabhan |
| 10,701,054 B2 | 6/2020 | Padmanabhan et al. |
| 10,915,891 B1 | 2/2021 | Winklevoss |

(Continued)

FOREIGN PATENT DOCUMENTS

| AU | 2019345039 A1 | 4/2021 |
| AU | 2019345040 A1 | 4/2021 |

(Continued)

OTHER PUBLICATIONS

U.S. Appl. No. 16/294,646, Corrected Notice of Allowance dated Jun. 30, 2021, 11 pgs.

(Continued)

*Primary Examiner* — Austin J Moreau
*Assistant Examiner* — Chhian (Amy) Ling
(74) *Attorney, Agent, or Firm* — Polygon IP, LLP

(57) ABSTRACT

A request to present digital content at a client machine associated with a designated network identifier may be received. For each of a plurality of preference characteristics, a respective characteristic query message may be transmitted via a network to a respective plurality of identity nodes via a gossip communication protocol defining a peer-to-peer procedure for transmitting information among the plurality of identity nodes. For each of the plurality of preference characteristics, a respective preference identification response message that includes a respective preference value corresponding with the respective preference characteristic may be received. The designated network identifier may be stored in a trust ledger shared among the plurality of identity nodes. A digital content item may be selected based at least in part on the preference values.

19 Claims, 13 Drawing Sheets

(56) References Cited

U.S. PATENT DOCUMENTS

| | | | |
|---|---|---|---|
| 11,038,771 B2 | 6/2021 | Padmanabhan | |
| 11,082,226 B2 | 8/2021 | Hildebrand et al. | |
| 11,128,465 B2 | 9/2021 | Hildebrand et al. | |
| 11,144,335 B2 | 10/2021 | Padmanabhan | |
| 11,157,484 B2 | 10/2021 | Padmanabhan | |
| 11,200,569 B1 | 12/2021 | James | |
| 11,244,313 B2 | 2/2022 | Padmanabhan | |
| 11,288,280 B2 | 3/2022 | Padmanabhan | |
| 11,372,635 B2 | 6/2022 | Padmanabhan | |
| 11,431,486 B2 | 8/2022 | Padmanabhan | |
| 11,431,693 B2 | 8/2022 | Padmanabhan | |
| 11,468,406 B2 | 10/2022 | Padmanabhan | |
| 11,469,886 B2 | 10/2022 | Padmanabhan | |
| 11,488,176 B2 | 11/2022 | Padmanabhan | |
| 2011/0246460 A1* | 10/2011 | Hsieh | G06F 16/182 709/202 |
| 2015/0213443 A1 | 7/2015 | Geffon | |
| 2016/0260169 A1 | 9/2016 | Arnold | |
| 2017/0242887 A1 | 8/2017 | Zhao et al. | |
| 2019/0057223 A1 | 2/2019 | Hanna | |
| 2019/0080406 A1 | 3/2019 | Molinari | |
| 2019/0146979 A1 | 5/2019 | Madisetti | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1* | 8/2019 | Padmanabhan | H04L 9/3239 |
| 2019/0238316 A1 | 8/2019 | Padmanabhan | |
| 2019/0238525 A1 | 8/2019 | Padmanabhan | |
| 2019/0244243 A1 | 8/2019 | Goldberg et al. | |
| 2019/0303445 A1 | 10/2019 | Padmanabhan | |
| 2019/0333033 A1 | 10/2019 | Finlow-Bates | |
| 2019/0340623 A1 | 11/2019 | Rivkind | |
| 2019/0340689 A1 | 11/2019 | Gordon, III | |
| 2019/0377806 A1 | 12/2019 | Padmanabhan et al. | |
| 2019/0385236 A1 | 12/2019 | McConnell | |
| 2020/0036515 A1 | 1/2020 | Chari et al. | |
| 2020/0042939 A1 | 2/2020 | Padmanabhan | |
| 2020/0089663 A1 | 3/2020 | Padmanabhan | |
| 2020/0089670 A1 | 3/2020 | Padmanabhan et al. | |
| 2020/0089671 A1 | 3/2020 | Padmanabhan et al. | |
| 2020/0089672 A1 | 3/2020 | Velisetti et al. | |
| 2020/0092362 A1* | 3/2020 | Viswanathan | H04L 67/1095 |
| 2020/0112434 A1 | 4/2020 | Goodson | |
| 2020/0133955 A1 | 4/2020 | Padmanabhan et al. | |
| 2020/0134656 A1 | 4/2020 | Padmanabhan | |
| 2020/0159847 A1 | 5/2020 | Smith et al. | |
| 2020/0184558 A1 | 6/2020 | Crumb | |
| 2020/0202038 A1* | 6/2020 | Zhang | G06F 16/2365 |
| 2020/0204375 A1 | 6/2020 | Coulmeau et al. | |
| 2020/0204557 A1 | 6/2020 | Singh et al. | |
| 2020/0213127 A1 | 7/2020 | Maniyar | |
| 2020/0250174 A1 | 8/2020 | Padmanabhan et al. | |
| 2020/0250176 A1 | 8/2020 | Padmanabhan | |
| 2020/0250177 A1 | 8/2020 | Padmanabhan | |
| 2020/0250295 A1 | 8/2020 | Padmanabhan | |
| 2020/0250661 A1 | 8/2020 | Padmanabhan et al. | |
| 2020/0250683 A1 | 8/2020 | Padmanabhan et al. | |
| 2020/0250747 A1 | 8/2020 | Padmanabhan | |
| 2020/0252205 A1 | 8/2020 | Padmanabhan | |
| 2020/0252404 A1 | 8/2020 | Padmanabhan | |
| 2020/0252406 A1 | 8/2020 | Padmanabhan et al. | |
| 2020/0287718 A1 | 9/2020 | Hildebrand et al. | |
| 2020/0287719 A1 | 9/2020 | Hildebrand et al. | |
| 2020/0349142 A1 | 11/2020 | Padmanabhan | |
| 2020/0349564 A1 | 11/2020 | Padmanabhan et al. | |
| 2020/0371995 A1 | 11/2020 | Padmanabhan | |
| 2020/0374105 A1 | 11/2020 | Padmanabhan | |
| 2021/0042746 A1 | 2/2021 | Westland | |
| 2021/0117938 A1 | 4/2021 | Arora | |
| 2021/0133700 A1 | 5/2021 | Williams | |
| 2021/0150610 A1 | 5/2021 | Mao | |
| 2021/0152536 A1 | 5/2021 | Padmanabhan | |
| 2021/0182272 A1 | 6/2021 | Shpurov | |
| 2021/0182423 A1 | 6/2021 | Padmanabhan | |
| 2021/0182773 A1 | 6/2021 | Padmanabhan | |
| 2021/0182806 A1 | 6/2021 | Ornelas | |
| 2021/0226774 A1 | 7/2021 | Padmanabhan | |
| 2021/0240498 A1 | 8/2021 | Padmanabhan | |
| 2021/0243193 A1 | 8/2021 | Padmanabhan | |
| 2021/0342329 A1 | 11/2021 | Padmanabhan | |
| 2021/0373878 A1 | 12/2021 | Padmanabhan | |
| 2021/0374759 A1 | 12/2021 | Padmanabhan | |
| 2021/0377028 A1 | 12/2021 | Doney | |
| 2021/0382966 A1 | 12/2021 | Shii | |
| 2021/0385087 A1 | 12/2021 | Hildebrand et al. | |
| 2021/0397604 A1 | 12/2021 | Padmanabhan | |
| 2022/0006705 A1 | 1/2022 | Padmanabhan | |
| 2022/0027356 A1 | 1/2022 | Padmanabhan | |
| 2022/0058633 A1 | 2/2022 | Yantis | |
| 2022/0114238 A1 | 4/2022 | Padmanabhan | |
| 2022/0129475 A1 | 4/2022 | Thaw | |
| 2022/0210061 A1* | 6/2022 | Simu | H04L 9/14 |
| 2022/0245560 A1 | 8/2022 | Dhaliwal | |
| 2022/0248165 A1 | 8/2022 | Dhaliwal | |
| 2022/0358462 A1 | 11/2022 | Oldfield | |
| 2022/0398538 A1* | 12/2022 | Jakobsson | G06Q 10/101 |

FOREIGN PATENT DOCUMENTS

| | | |
|---|---|---|
| AU | 2019345041 A1 | 4/2021 |
| AU | 2020351764 A1 | 4/2022 |
| CN | 111902810 A | 11/2020 |
| CN | 111919417 A | 11/2020 |
| CN | 113039568 A | 6/2021 |
| CN | 113056760 A | 6/2021 |
| EP | 3747153 A1 | 12/2020 |
| EP | 3776255 A1 | 2/2021 |
| EP | 3853794 A1 | 7/2021 |
| JP | 2021512416 A | 5/2021 |
| WO | 2019152750 A1 | 8/2019 |
| WO | 2019190855 A1 | 10/2019 |
| WO | 2019241071 A1 | 12/2019 |
| WO | 2020061224 A1 | 3/2020 |
| WO | 2020061225 A1 | 3/2020 |
| WO | 2020061226 A1 | 3/2020 |
| WO | 2020160109 A1 | 8/2020 |
| WO | 2020234814 A1 | 11/2020 |
| WO | 2021116950 A1 | 6/2021 |

OTHER PUBLICATIONS

U.S. Appl. No. 16/294,646, Examiner Interview Summary dated Mar. 29, 2021, 3 pgs.
U.S. Appl. No. 16/294,646, Examiner Interview Summary dated May 28, 2021, 2 pgs.
U.S. Appl. No. 16/294,646, Examiner Interview Summary dated Jun. 30, 2021, 1 pg.
U.S. Appl. No. 16/294,646, Non-Final Office Action dated Feb. 22, 2021, 23 pgs.
U.S. Appl. No. 16/294,646, Notice of Allowance dated May 28, 2021, 13 pgs.
U.S. Appl. No. 16/294,654, Corrected Notice of Allowance dated Jun. 30, 2021, 10 pgs.
U.S. Appl. No. 16/294,654, Examiner Interview Summary dated Jun. 1, 2021, 1 pg.
U.S. Appl. No. 16/294,654, Examiner Interview Summary dated Jun. 30, 2021, 1 pg.
U.S. Appl. No. 16/294,654, Non-Final Office Action dated Feb. 22, 2021, 26 pgs.
U.S. Appl. No. 16/294,654, Notice of Allowance dated Jun. 1, 2021, 13 pgs.
U.S. Appl. No. 16/294,654. Examiner Interview Summary dated Mar. 29, 2021, 2 pgs.
Office Action (Non-Final Rejection) dated Mar. 2, 2023 for U.S. Appl. No. 17/410,376 (pp. 1-26).
Office Action dated Mar. 6, 2023 for U.S. Appl. No. 17/517,541 (pp. 1-28).
Padmanabhan, Prithvi Krishnan et al., "Database System Public Trust Ledger Contract Linkage", U.S. Appl. No. 17/412,059, filed Aug. 25, 2021, 81 pages.

(56) References Cited

OTHER PUBLICATIONS

Padmanabhan, Prithvi Krishnan, "Database System Public Trust Ledger Architecture", U.S. Appl. No. 17/410,366, filed Aug. 24, 2021, 62 pages.

Padmanabhan, Prithvi Krishnan, "Database System Public Trust Ledger Architecture", U.S. Appl. No. 17/410,376, filed Aug. 24, 2021, 62 pages.

Padmanabhan, Prithvi Krishnan, "Database System Public Trust Ledger Contract Linkage", U.S. Appl. No. 17/412,056, filed Aug. 25, 2021, 81 pages.

Padmanabhan, Prithvi Krishnan, "Database System Public Trust Ledger Multi-Owner Token Architecture", U.S. Appl. No. 17/517,543, filed Nov. 2, 2021, 94 pages.

Padmanabhan, Prithvi Krishnan, "Database System Public Trust Ledger Token Creation and Exchange", U.S. Appl. No. 17/517,522, filed Nov. 2, 2021, 97 pages.

Padmanabhan, Prithvi Krishnan, "Database System Public Trust Token Redeem Architecture Using Nallets", U.S. Appl. No. 17/517,541, filed Nov. 2, 2021, 96 pages.

\* cited by examiner

DECENTRALIZED INFORMATION MANAGEMENT DATABASE SYSTEM

FIELD OF TECHNOLOGY

This patent document relates generally to cloud computing environments, and more specifically to the secure management of personally identifying information in cloud computing environments involving a metaverse.

BACKGROUND

The term "metaverse" refers to an immerse virtual-reality computing experience that allows users to interact with a computer-generated environment and other users. A metaverse may be combined with augmented reality. For example, a user may wear a virtual reality headset, which may present a virtual overlay on a physical environment. The user may then interact with both the physical environment and the virtual overlay.

A metaverse may be implemented on or in connection with a cloud computing environment. "Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Storing personally identifying information is necessary for many cloud computing and metaverse applications. For example, personally identifying information may be associated with users of a cloud computing environment and used to perform operations such as verifying identity or authorizing a user to perform a task. However, the distribution and storage of personally identifying information involves certain risks, such as the risk that the information is publicly leaked.

BRIEF DESCRIPTION OF THE DRAWINGS

The included drawings are for illustrative purposes and serve only to provide examples of possible structures and operations for the disclosed inventive systems, apparatus, methods and computer program products for secure identity management. These drawings in no way limit any changes in form and detail that may be made by one skilled in the art without departing from the spirit and scope of the disclosed implementations.

DETAILED DESCRIPTION

Figure 1:
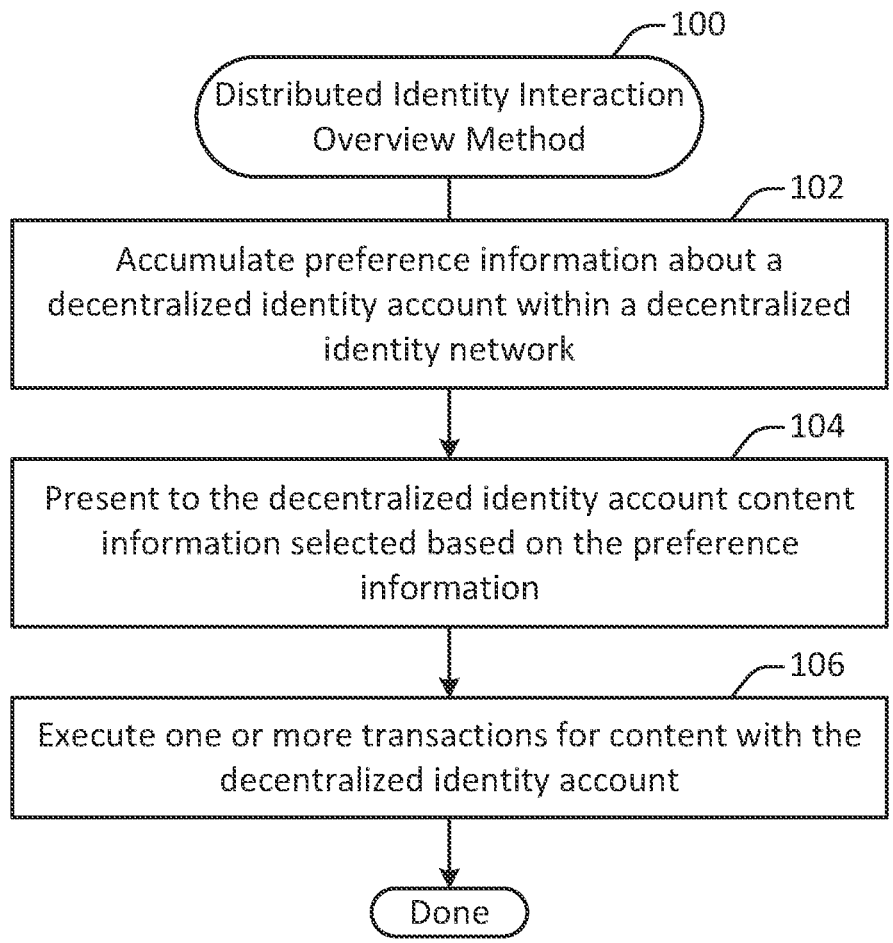
FIG. 1 illustrates an example of a distributed identity interaction overview method, performed in accordance with one or more embodiments.

According to various embodiments, techniques and mechanisms described herein facilitate the secure and distributed collection and use of preference-related information in a digital space. A user's identity may be specified via a network identifier, which may or may not be tied to a user's identity in the real world. Information about the network identifier may be collected by different systems in a virtual environment. Information may then be queried and applied without a comprehensive profile being shared between different systems.

Consider the situation of individuals. In the physical world, an individual often substantiates his or her identity with documents like a driver's license. Such documents assert facts about the individual such as name, age, or eye color. However, driver's licenses don't exist on the Internet. In network-centric models in which information is decentralized, the problem grows exponentially as users must deal with many siloed systems. This decentralization results in users' information being replicated and occasionally hacked or leaked, compromising privacy and undermining security. This problem exists for virtually any kind of private information related to virtually any kind of entity. The problem is even worse when information extends beyond identity verification and into preferences.

Privacy problems are compounded in a metaverse, where an individual may interact with a variety of entities such as business through a metaverse service provider. When using conventional techniques, because the metaverse service provider may act as an intermediary between the individual and the entities, over time the metaverse service provider may be able to accumulate a comprehensive view of the user, including a substantial amount of data that the user may prefer to keep private. That is, in addition to the siloed systems each storing various private information associated with a user, the metaverse provider may over time accumulate close to a superset of the information stored in the siloed systems.

A decentralized identity system facilitates the identification of an entity across different systems that are in a distributed decentralized network. However, conventional decentralized identity suffers from various problems. First, many identification schemes involve usernames and passwords, which typically result in replicating data (mostly out-of-sync) in different identity silos around the network. This is referred to as the Proximity Problem. Second, digital identity can be aggregated in identity hubs providing single sign-on, such as Google or Facebook, but most places (e.g., websites or computing environments) do not use such providers. This is referred to as the Scale Problem. Third, conventional identity solutions are limited by fixed database schema or attribute sets for the identified items, which is referred to as the Flexibility Problem. Fourth, conventional identity solutions rely on collections of personally identifying information for an entity, often collected without knowledge. This data is replicated over and over again in different systems, with universal identifiers such as Social Security Numbers or phone numbers used to correlate identity information, again without a subject's knowledge. This is referred to as the Privacy Problem. Fifth, the data in the many silos is often shared with others without consent, often for the benefit of the organization who controls the silo. This is referred to as the Consent Problem.

As the world moves toward network-centric information models, each system will have its own set of information for an entity. This information needs to be matched up in the decentralized world to produce a decentralized id (DID) so that the network can establish a complete view of that entity. Traditional approaches to solve this problem use standard mechanisms that involve matching and merging information and lead to many centralized hubs creating a siloed effect.

In contrast to conventional approaches, techniques and mechanisms described herein provide an identification mechanism by consensus where an individual can be identified without sharing private information and duplicating data across various systems. Techniques and mechanisms described herein also facilitate the maintaining of personal control over digital information and the application of consent-based rules to information sharing. Such techniques may be extended to support the collection and application of information that sheds light on an individual's preferences within a digital space.

Consider the use case of Alexandra, who is interacting with service providers within a metaverse. Each service provider may accumulate information about Alexandra, either within its own systems, within distributed customer relations management CRM providers that store information for the service providers, or within the metaverse provider itself. When using conventional techniques, openly sharing such information across those systems would result in each party having access to a comprehensive profile of Alexandra, which may violate Alexandra's sense of privacy. Alternatively, failing to share such information may result in a more limited experience for Alexandra, in which she is presented with content that does not reflect her preferences.

When using techniques and mechanisms described herein, information may be shared in a more limited fashion, through a distributed identity network. The distributed identity network may link publicly available information with Alexandra's network identifier, such as transaction information stored in a public trust ledger and associated with wallets linked to Alexandra's network identifier. Alternatively, or additionally, the distributed identity network may also link less public information with Alexandra's network identifier, such as preferences revealed through Alexandra's interactions with particular service providers. Less public information may be protected by the distributed identity network. For instance, interested parties may be able to query the distributed identity network to ascertain specific facts about Alexandra but may be unable to access a comprehensive profile about Alexandra. In this way, Alexandra may be provided with an improved experience while at the same time her privacy may be more fully protected.

Techniques and mechanisms described herein differ substantially and provide numerous advantages over conventional decentralized identity management techniques. For example, Sovrin is a decentralized, global public utility for managing a lifetime portable identity for any person, organization, or thing. Sovrin architecture involves combination of a public DLT for identity operated by permissioned nodes governed by a global non-profit foundation. However, the Sovrin system assumes that the issuer has verified the information, which is untrue in many business contexts and which presents significant scaling problems as the network grows. In contrast, techniques and mechanisms described herein provide for identity verification and management even when member nodes rely at least in part on unverified information.

As another example, conventional log-based blockchain systems may be used for identity verification and management. However, in such an approach, logs grow without limit because the blockchain maintains the entire record of transactions rather than the realized state of the transactions. In conventional log-based blockchain systems, the only mechanism for communications is via transactions against the log. Such messages are stored forever and can add up very quickly. Further, the data that those messages contain is stored forever in the log, potentially creating a possibility of exploitation. Storing data in this way may even violate data privacy regulations, since deleting the data involves appending a delete request to the log rather than actually removing data from the log. Another problem with immutable logs, a feature of conventional log-based blockchain identity management solutions, is that the query data is exposed. If the blockchain is used to represent the query process, then the query metadata will forever be on the chain and directly traceable to individuals.

In contrast, techniques and mechanisms described herein involve storing the realized state of the transactions (e.g., in a merkle database), which grows toward a stable log size as the size of the replicated data becomes stable. The reduction in log size means that there is less data to replicate across the system for new members to join the network. In addition, new members can start participating in query execution and result production without having to replicate the transaction log first. Also, requested results can be served by other members while replication proceeds in parallel, solving synchronization problems in lifecycle decisions. Further, when information is stored in an editable shared database rather than a log, the information can be deleted as necessary. Thus, although techniques and mechanisms described herein may be used in conjunction with blockchain technology, for instance to store the information in the trust ledger, the architectural differences from conventional techniques address many of the drawbacks of conventional identity management approaches. Another advantage of embodiments described herein is that although query data is replicated throughout the system, the data stored as the results of previous queries can be minimized so that the personally identifying information inherent in the queries themselves does not "leak" out of the system. For example, the query metadata does not need to be transmitted throughout the system.

According to various embodiments, techniques and mechanisms described herein involve a two-pronged approach for identification. A gossip protocol in combination with zero-knowledge proofs may be used to determine a consensus as to an entity's identity. The gossip may be based on results evaluated based on the information available. The architecture may be based on a federation of pools configured with a delegation pattern to retrieve local identity information from individual networks and provide the results to the main network that maintains a global identity.

According to various embodiments, the system may construct and execute a query to identify an entity on a field-by-field basis. The system may then evaluate candidates that match any field on a field-by-field basis to generate a confidence score. If an identity is found that exceeds a predetermined threshold, then the request may be designated as valid. For many requests, only one identity can score high enough to be valid. However, but in the event that the request validates as more than one identity, the higher scoring identity may be chosen.

FIG. 1 illustrates an example of a distributed identity interaction overview method 100, performed in accordance with one or more embodiments. The method 100 may be performed at one or more components within a distributed computing system, such as the system 200 discussed with respect to FIG. 2. For example, the method 100 may be performed at a metaverse service provider in communication with a distributed identity network.

According to various embodiments, the method 100 may be performed in order to coordinate activity between a client machine, one or more distributed customer relations management (CRM) providers, one or more service providers, a distributed identity service, and/or a metaverse provider. This coordination may allow the client machine to present personalized content to a user accessing a metaverse at a client machine without the metaverse provider accumulating a profile of personally identifying and private information about the user.

At 102, preference information about a decentralized identity account is accumulated within a decentralized identity network. According to various embodiments, such information may be accumulated by decentralized systems observing individual interactions with the decentralized identity account. Rather than sharing that information amongst themselves, such information may instead be shared with the decentralized identity system. Additional details regarding the accumulation of preference information within a decentralized identity network are described with respect to the method 300 shown in FIG. 3.

At 104, content information selected based on the preference information is presented to the decentralized identity account. According to various embodiments, such information may be presented by querying the decentralized identity system for the preference information. The result of those queries may be provided to, for instance, an artificial intelligence system configured to predict content of interest based on preferences that were previously expressed, either implicitly or implicitly. Additional details regarding the selection of content information based on such preference information are described with respect to the method 400 shown in FIG. 4.

At 106, one or more transactions for content with the decentralized identity account are executed. According to various embodiments, executing the one or more transactions may involve implementing one or more blockchain-related transactions for digital content. Alternatively, or additionally, physical goods, physical services, and/or digital services may be purchased in a similar fashion. Additional details regarding techniques for implementing transactions for content are discussed are discussed with respect to the method 500 shown in FIG. 5.

Figure 2:
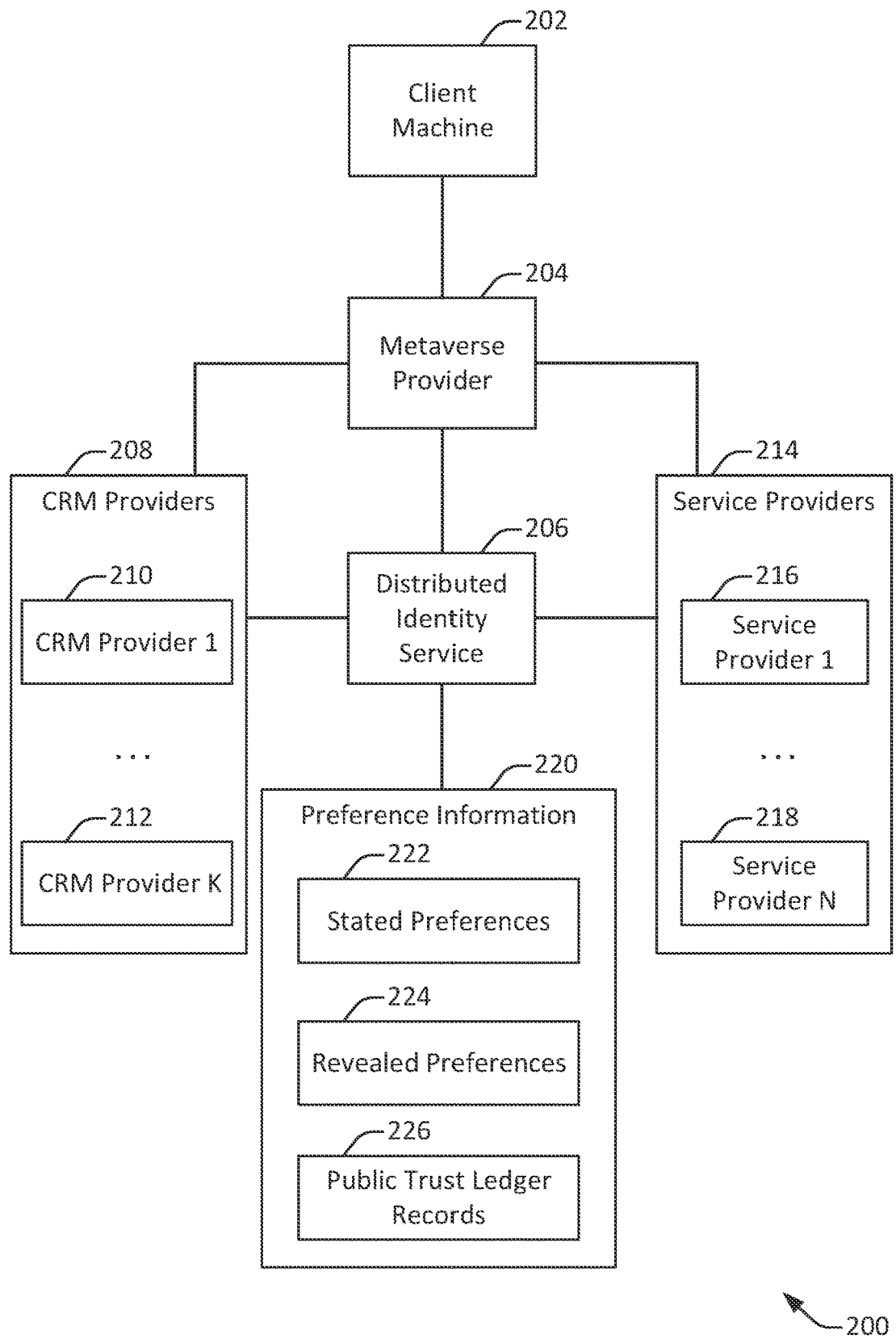
FIG. 2 illustrates an example of an arrangement of components in a distributed computing system, configured in accordance with one or more embodiments.

FIG. 2 illustrates an example of an arrangement of components in a distributed computing system 200, configured in accordance with one or more embodiments. According to various embodiments, the distributed computing system 200 may be used, in conjunction with other techniques and mechanism described herein.

The distributed computing system 200 includes a client machine 202 in communication with a metaverse provider 204. The metaverse provider is in turn in communication with a distributed identity service 206, one or more CRM providers 208, and one or more service providers 214. The CRM providers 208 include the CRM provider 1 210 through the CRM provider K 212. The service providers 214 include the service provider 1 216 through the service provider N 218. The system includes preference information 220, which includes stated preferences 222, revealed preferences 224, and public trust ledger records 226.

According to various embodiments, the CRM providers may be implemented in various ways. For example, a CRM provider may be implemented as a centralized service that is accessible via an endpoint controlled by the CRM provider. As another example, a CRM provider may be implemented as a decentralized or distributed service that is accessible via more than one endpoint. As yet another example, an oracle may act as an aggregator for more than one CRM provider and may serve as an endpoint for accessing information stored in the CRM providers.

According to various embodiments, the client machine 202 may be any one or more computing devices configured to provide access to a metaverse. For example, the client machine 202 may include a virtual reality, mixed reality, or augmented reality device such as a headset. The virtual reality or augmented reality device may be in communication with another computing device such as a mobile phone, laptop computer, and/or desktop computer. As another example, the client machine 202 may be a computing device such as a mobile phone or laptop computer without an associated virtual reality, mixed reality, or augmented reality device. That is, any suitable configuration of one or more client machines may be used.

The metaverse provider 204 may be any provider of a metaverse experience. For example, the metaverse provider may be a centralized service such as that provided by Meta. As another example, the metaverse provider may be a decentralized service such as a blockchain-based peer-to-peer virtual space system.

According to various embodiments, a metaverse experience may be a virtual, augmented, or mixed reality environment in which users can interact with one another. For example, a metaverse may involve a virtual world that users can navigate. In some portions or configurations, the virtual world may be independent of the real world. In other portions or configurations, the virtual world may be overlain on or otherwise mixed with the real world. For example, users may view digital artifacts such as avatars of one another overlain on the physical world. As another example, users may view the physical world through each others viewpoints such as cameras on mobile computing devices, headsets, laptop computers, or other suitable devices.

According to various embodiments, the distributed identity service 206 may be an identity node in a distributed identity network. The identity node may coordinate with other identity nodes to validate information about a user's identity without revealing information to the other identity nodes. An example of such a configuration is shown in the system 600 in FIG. 6, while an example of an identity node is shown at 602 in FIG. 6. Techniques and mechanisms related to distributed identity verification are discussed throughout the application, and specifically with respect to FIGS. 7-12.

According to various embodiments, the CRM providers 208 may include one or more providers of on-demand customer relations management services. Such service providers may include, but are not limited to: Salesforce, Microsoft, and Amazon. A CRM provider may provide CRM services to a number of service providers via the internet. For example, different internet service providers such as Comcast and AT&T may each manage their interactions with customers at least in part via one or more of the CRM providers.

In some embodiments, a CRM provider may provide services beyond those included in a narrow definition of CRM. For example, a CRM provider may provide services such as sales management and/or service management. As another example, a CRM provider may provide one or more of a variety of cloud computing services to client individuals and/or business entities.

In some implementations, a CRM provider may store a relatively limited amount of information about at least some individuals. For example, consider a configuration in which Comcast employs a CRM provider to manage information about its customers. To increase privacy and reduce opportunities for data leakage, Comcast may store some or all of the personally identifying information about its customers in a different location, outside the CRM provider. Within the CRM provider Comcast may store account information such as a distributed identity service identifier, a modem linked to the distributed identity service identifier, a Comcast account identifier, and other less sensitive information. In this way, Comcast may access CRM services via the CRM provider while maintaining control over personally identifying information about its customers.

According to various embodiments, the service providers 214 include business entities employing one or more of the CRM providers to store CRM information about customers of the service provider. For example, service providers may include utility providers, retail stores, wholesale stores, digital service providers, or other purveyors of physical and/or digital goods and/or services.

Preference information is shown at 220. According to various embodiments, the preference information is not stored in a centralized location, but rather is disaggregated across the CRM providers 208, the service providers 214, and the metaverse provider 204. The preference information can be accessed by querying the distributed identity service 206, as described with respect to the FIGS. 7-12. That is, preference information can be queried in a fashion similar to identity information.

According to various embodiments, the stated preference information 222 may include any preference information explicitly stated by a user associated with a distributed identity account. Such information may be provided to the metaverse provider 204. Alternatively, or additionally, such information may be provided to one or more of the CRM providers 208 and/or the service providers 214. For instance, a user may explicitly state a preference for particular classes of physical and/or digital goods and/or services too one or more parties represented in FIG. 2.

In some implementations, the revealed preference information 224 may include any information any information implicitly revealed by the distributed identity account and one or more of the parties represented in FIG. 2. For example, the user associated with the distributed identity account may click on one or more advertisements associated with particular kinds of content. As another example, the user associated with the distributed identity account may purchase a digital or physical good or service associated with particular kinds of content. Such revealed preference information may then be recorded within a database system associated with a CRM provider and/or a service provider.

Public trust ledger records are shown at 226. According to various embodiments, the public trust ledger information may include any information recorded in a public trust ledger in association with a public trust ledger account that is connected with the distributed identity account. For example, the distributed identity account may be linked with one or more wallets in a public trust ledger where digital transactions associated with the distributed identity account are recorded. Such information may include, for instance, one or more fungible and/or non-fungible tokens purchased by the distributed identity account may be stored in such a wallet. Such information may reveal preference information about the user associated with the public trust ledger account.

In particular embodiments, some or all of the preference information 220 may be stored within one or more non-fungible tokens. In such a configuration, service providers may be authorized to provide preference information for storage in the NFT. For instance, the owner of the distributed identity service ID may authorize a service provider to update the preference information.

Figure 3:
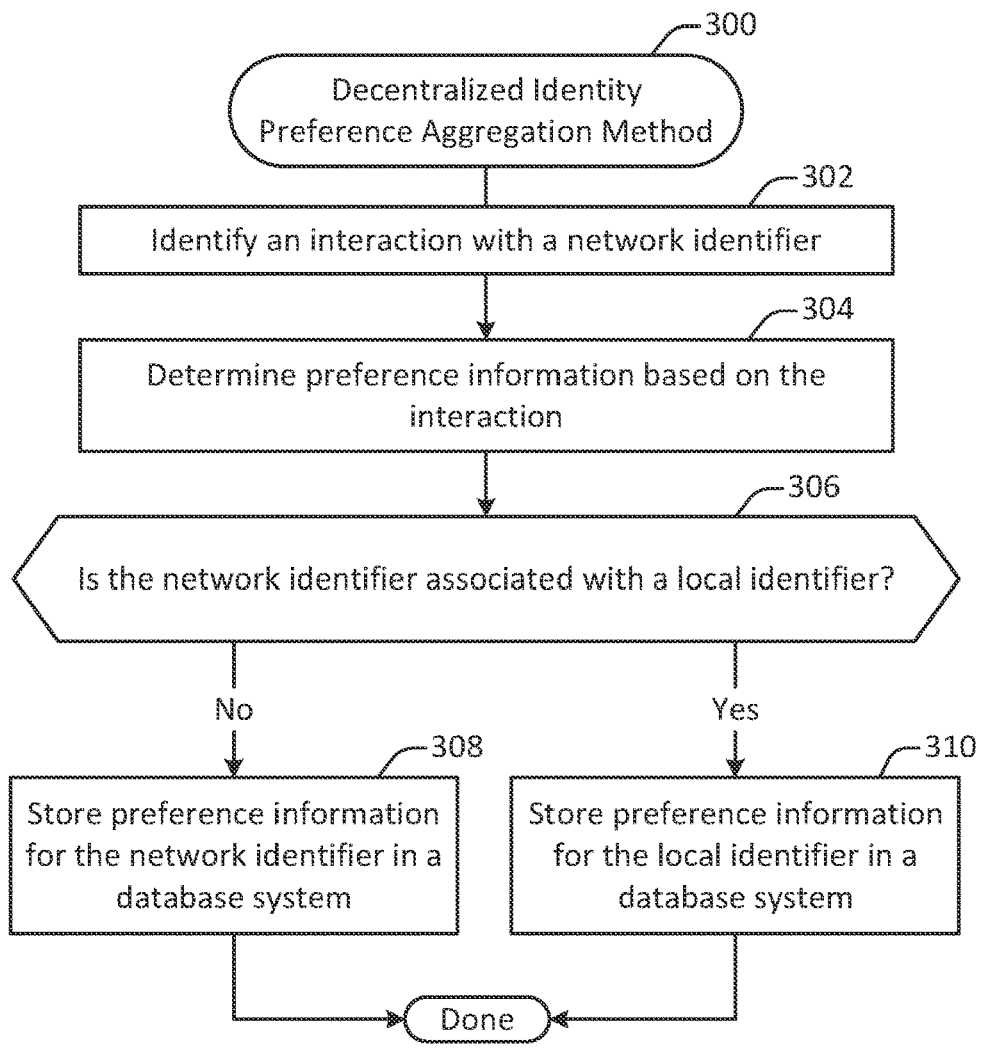
FIG. 3 illustrates an example of decentralized identity preference aggregation method, configured in accordance with one or more embodiments.

FIG. 3 illustrates an example of decentralized identity preference aggregation method 300, configured in accordance with one or more embodiments. The method 300 may be performed in order to collect, in a decentralized fashion, information about a user associated with a network identifier. Such information may be identified and stored at decentralized systems, and then be used to respond to queries as discussed with respect to FIG. 4.

According to various embodiments, the method 300 may be performed at one or more systems participating in a decentralized identity network. For example, the method 300 may be performed at one or more of the CRM providers, one or more of the decentralized service providers, or the metaverse provider shown in FIG. 2.

According to various embodiments, the method 300 may be used to record information associated with various types of interactions. For example, the method 300 may be used to store an indication that a particular network identifier has made a purchase from a particular provider of goods or services. As another example, the method 300 may be used to store an indication that a particular network identifier has taken an action indicative of interest in a particular topic or topic. As yet another example, the method 300 may be used to store an indication that a particular network identifier is considered a business lead for a prospective transaction in the future. For instance, an avatar associated with a network identifier may navigate a metaverse implemented as a virtual space and look through virtual shops. Because the avatar is connected to the metaverse only through the network identifier, information about the avatar may be otherwise unknown to parties with which the avatar interacts. However, such parties can individually accumulate information about the individual associated with the avatar via the method 300 and then share such information on a limited basis as discussed with respect to the method 400 shown in FIG. 4.

An interaction with a network identifier is identified at 302. According to various embodiments, various types of interactions may be detected. For example, a user associated with the network identifier in a metaverse may choose to view an advertisement or display associated with a good, service, and/or topic. As another example, a user associated with the network identifier may visit a website associated with a good, service, and/or topic. As yet another example, a user associated with a network identifier may interact with a real or virtual person such as a real or virtual sales associate.

Preference information is determined based on the interaction at 304. According to various embodiments, different types of interactions may reveal different types of preferences. For example, a choice to view an advertisement or display, to visit a website, or to interact with a real or virtual person may indicate that the user associated with the network identifier is interested in or has a preference for a given topic or category of good or service. As another example, in some instances a choice may indicate that the user associated with the network identifier is not interested in or dislikes a given topic or category of good or service. For instance, the user may approach a virtual display and then quickly move away.

A determination is made at 306 as to whether the network identifier is associated with a local identifier. According to various embodiments, the network identifier may be shared across the decentralized identity nodes in a decentralized identity network. For example, the network identity node may be recorded on a shared public trust ledger such as a blockchain. In contrast, a local identifier may be specific to a particular system, such as a particular CRM provider and/or a service provider. An identity node may maintain a correspondence table between local identifiers and network identifiers. Accordingly, the determination made at 306 may involve consulting a correspondence table to identify the presence or absence of such a correspondence.

If the network identifier is associated with a local identifier, then the preference information may be stored in association with the local identifier at 310 in a database system. Then, when information about the network identifier is requested, an identity node may rely on a correspondence table to identify the information stored in association with the corresponding local identifier.

If instead the network identifier is not associated with a local identifier, then at 308 the preference information may be stored in association with the network identifier in a database system. The information may then be immediately available for responding to queries for information about preferences associated with the network identifier.

In some embodiments, if the network identifier is not associated with a local identifier, then a local identifier may be created along with an entry in a correspondence table. In this way, the system may store data in a consistent manner across individuals that become known to the system in different ways.

Figure 4:
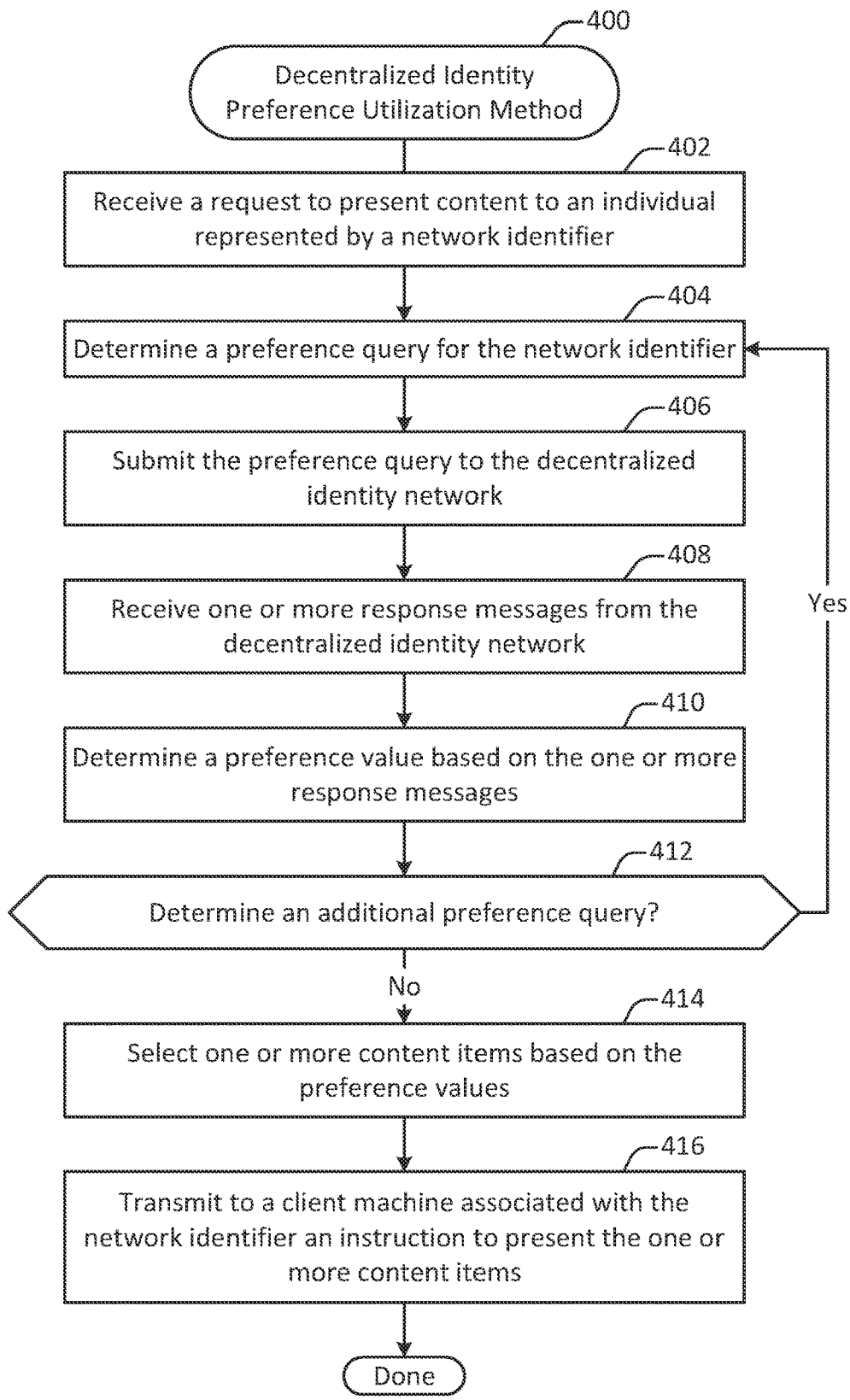
FIG. 4 illustrates an example of a distributed identify preference utilization method, performed in accordance with one or more embodiments.

FIG. 4 illustrates an example of a distributed identify preference utilization method 400, performed in accordance with one or more embodiments. According to various embodiments, the method 400 may be used to allow a system to query a decentralized identity network for information stored as discussed with respect to the method 300 shown in FIG. 3.

According to various embodiments, the method 400 may be performed at one or more systems participating in a decentralized identity network. For example, the method 400 may be performed at one or more of the CRM providers, one or more of the decentralized service providers, or the metaverse provider shown in FIG. 2. The system at which the method 400 is performed may be associated with an identity node such as the node 602 shown in FIGS. 6 and 7. In this way, the system may query the distributed identity network to retrieve preference information and/or validate identity claims.

A request is received at 402 to present content to an individual represented by a network identifier. According to various embodiments, the request may be received in any of a variety of contexts. For example, a digital avatar within a shared virtual environment such as a metaverse may navigate to a commercial space such as a virtual shop. As another example, a digital avatar within a shared virtual environment may navigate within a public space in which personalized advertising space is available. The personalized advertising space may be bid on in order to present the digital avatar with advertising specific to the digital avatar. As yet another example, a user may navigate to a website, where a request to present the user with an advertisement may be generated. As still another example, an individual may navigate to a media website or other location in which media such as video, images, or music is presented.

In particular embodiments, the request received at 402 may be at least in part a request to determine whether to admit an individual into a particular digital area. For instance, the request may seek to determine whether to admit the individual into a region within a virtual world, a portion of a website, or another such digital area.

A preference query is determined for the network identifier at 404. According to various embodiments, any of various types of preference queries may be generated. Some non-exhaustive examples of such queries are described below.

In some embodiments, a preference query may seek to determine whether a network identifier is already a customer of a service provider within a product or service space. For example, in some product spaces, such as vehicles, the fact that a person has recently made a purchase from one company may decrease the probability that the same person would make a purchase in the same product space from a different company.

In some embodiments, a preference query may seek to determine whether a network identifier is associated with an existing lead. For example, one or more previous interactions with the network identifier may have caused the creation of a lead within a database system associated with the system at which the method 400 is implemented.

In particular embodiments, the preference query may be limited to preference information. For example, one or more individual systems in a distributed identity network may have linked the network identifier to personally identifying information such as a name or email address. However, those systems may be precluded from revealing such information without the express permission of the individual.

In particular embodiments, identity queries may be used to validate identity claims, as discussed with respect to FIGS. 5-10. For example, if an individual associated with a network identifier asserts that they are associated with a particular email address, name, or other personally identifying information, such a claim may be verified by communicating with the distributed identity network.

In some embodiments, a preference query may seek to determine whether a user has expressed interest in a particular good, service, or topic. In such a situation, the preference query may link the network identifier with the identified good, service, or topic. Participants in the distributed identity network may then determine whether the network identifier is associated with preference information indicating a preference for the identified good, service, or topic. Such preference information may be identified as discussed with respect to the method 300 shown in FIG. 3.

The preference query is submitted to the decentralized identity network at 406. According to various embodiments, the one or more preference queries and/or one or more response messages may be transmitted via a gossip protocol. In this way, the query may be circulated among a plurality of identity nodes. However, the query need not necessarily be sent to every identity node. Further, both the source of the preference query and the source of responses to the preference query may be kept secret from the other nodes within the identity network.

One or more response messages received at 408 from the decentralized identity network. According to various embodiments, the one or more response messages may indicate preferences of the network identifier identified based on the preference query transmitted at 406.

A preference value is determined at 410 based on the one or more response messages. According to various embodiments, the preference value may be determined at least in part by aggregating different response messages. In some cases, an aggregation function may average different values. For instance, if different identity nodes each provide an estimated income level for a network identifier, the overall estimated income level may be set at the mean of the different values. In other cases, an aggregation function may employ a different approach, such as a min or a max. For example, if different identity nodes each report whether a network identifier has purchased a particular class of goods, then the maximum response may serve as the answer to that preference query, since an affirmative response by any node indicates that such a purchase has been made.

A determination is made at 412 as to whether to determine an additional preference query. In some embodiments, more than one query may be generated in parallel. Alternatively, or additionally, subsequent queries may be determined based at least in part on the results received from earlier queries.

According to various embodiments, additional preference queries may be generated until a terminating condition is met. Examples of such terminating conditions may include, but are not limited to: the passage of a designated period of time, the loss of an option to present content to the individual (e.g., the individual navigates away from a virtual area), a determination that content relevant to the individual is not available, and/or a determination that sufficient preference information has been identified for content relevant to the individual to be selected.

One or more content items are selected based on the preference values at 414. According to various embodiments, the content items may include media content, advertisements, representations of real and/or virtual goods and/or services, and prices for goods or services.

In particular embodiments, preference information may be determined in ways other than those that do not employ zero-knowledge queries. For example, a network identifier may state preferences to the decentralized identity system or one or more service providers and indicate that those preferences may be freely shared. As another example, a network identifier may be associated with an account in a public trust ledger on which transactions involving the network identifier are publicly recorded. Such information may be combined with preference information determined via one or more zero-knowledge queries to more accurately select content items for the network identifier.

In particular embodiments, the selection of the one or more content items may be performed at least in part by an artificial intelligence system. For example, the Einstein system available from Salesforce.com may be configured to recommend content for presentation based on a user's history and preferences.

In particular embodiments, the selection of one or more content items may involve determining whether to admit the user into a digital region. For instance, based on the user's preference information, the user may be admitted into or denied entry into a particular virtual world area, website portion, or other digital region.

An instruction to present the one or more content items is transmitted to a client machine associated with the network identifier at 416. According to various embodiments, the instruction may include a content item to present, such as an advertisement. The content may be presented on a website or within a shared virtual environment such as a metaverse.

In particular embodiments, the instruction to present the one or more content items may involve the creation of a virtual meeting space, the interaction of a real or simulated individual with an avatar associated with the network identifier, or any other type of interaction.

In some implementations, the content items may be presented in such a way that any subsequent transactions can be anonymous in both directions. From the perspective of the service provider, a good or service would be sold to a network identifier that may be disconnected from personally identifying information. From the perspective of the individual behind the network identifier, a good or service may be purchased through a shared virtual environment from an anonymous service provider whose identity is concealed by the metaverse provider.

In particular embodiments, such a configuration may allow for the anonymous purchase of physical goods or services. For example, the network identifier may receive a non-fungible token associated with a physical product, and this transaction may be recorded on a blockchain. Then, for instance, a physical good may be shipped to a particular location, at which point it may be redeemed in exchange for the non-fungible token.

Figure 5:
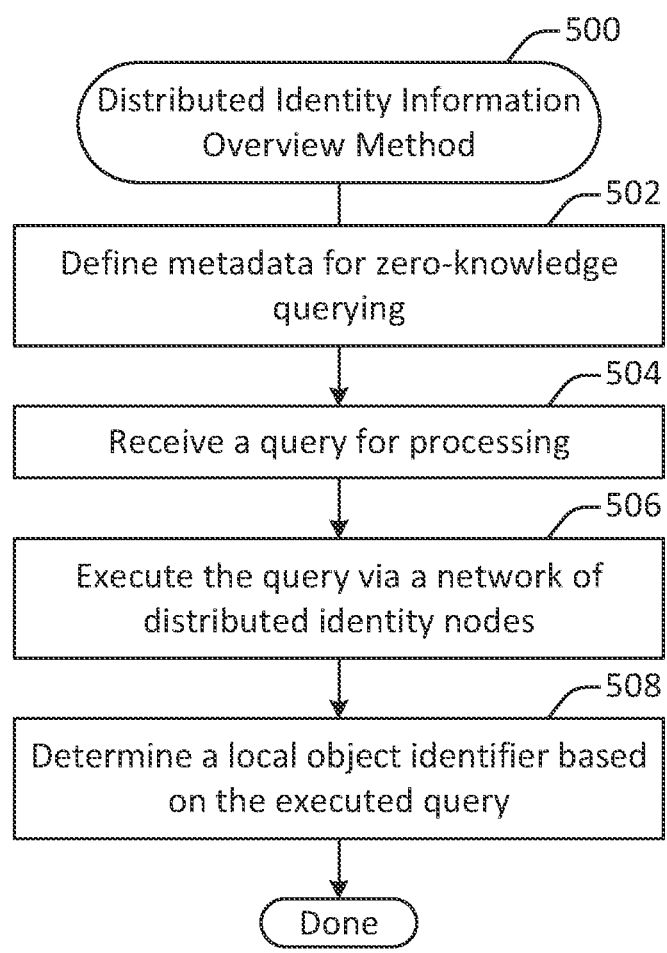
FIG. 5 illustrates an example of an arrangement of components in a distributed computing system, configured in accordance with one or more embodiments.

FIG. 5 illustrates an example of a decentralized identity overview method 500, performed in accordance with one or more embodiments. According to various embodiments, the method 500 may be performed at one or more components within one or more computing services environments. For example, the method 500 may be performed at one or more nodes in communication via a network.

At 502, metadata for zero-knowledge querying is defined. In some embodiments, metadata for zero-knowledge querying may be defined by an administrator. For example, an administrator may create a data object template that includes one or more fields to be used for identification of an instance of an item represented by the data object. An example of a system that may be used to facilitate zero-knowledge querying is discussed with respect to FIG. 6.

According to various embodiments, defining metadata for zero-knowledge querying may involve specifying one or more characteristics of an item to be identified, which is represented as a data object. For example, an individual may be represented as a data object having fields such as a first name, a last name, an age, a birthday, a mailing address, one or more email addresses, one or more social networking accounts, and/or a social security number. As another example, an organization may be represented as a data object having fields such as a name, a legal form (e.g., C-corporation, S-corporation, limited liability corporation, non-profit, etc.), a state of incorporation, a mailing address, a headquarters address, a chief executive officer, and/or one or more email addresses. As yet another example, a vehicle may be represented as a data object having fields such as a body style, a color, a vehicle identification number, a make, and/or a model.

At 504, a query is received for processing. According to various embodiments, the query may include one or more data values associated with an item to be identified. The item may correspond with a data object template created as discussed with respect to operation 502. Each data value may correspond with a metadata entry associated with an instance of the data object. For example, when identifying a person, the query may include any or all of a first name, a last name, a social security number, one or more email addresses, and/or one or more social media accounts.

In particular embodiments, the query may be generated when some or all of the information included in the query has not been verified by the local system at which the query is received. For example, a particular campus within a university system may need to validate the identify of a person who supplies a first name, a last name, a social security number, and an email address. The campus may be able to verify that the person has access to the email address, for instance by sending a confirmation email. However, the campus may not be able to verify that the social security number corresponds to the person associated with that email address. Accordingly, the campus may generate a query to validate the person's identity via zero-knowledge querying.

Figure 7:
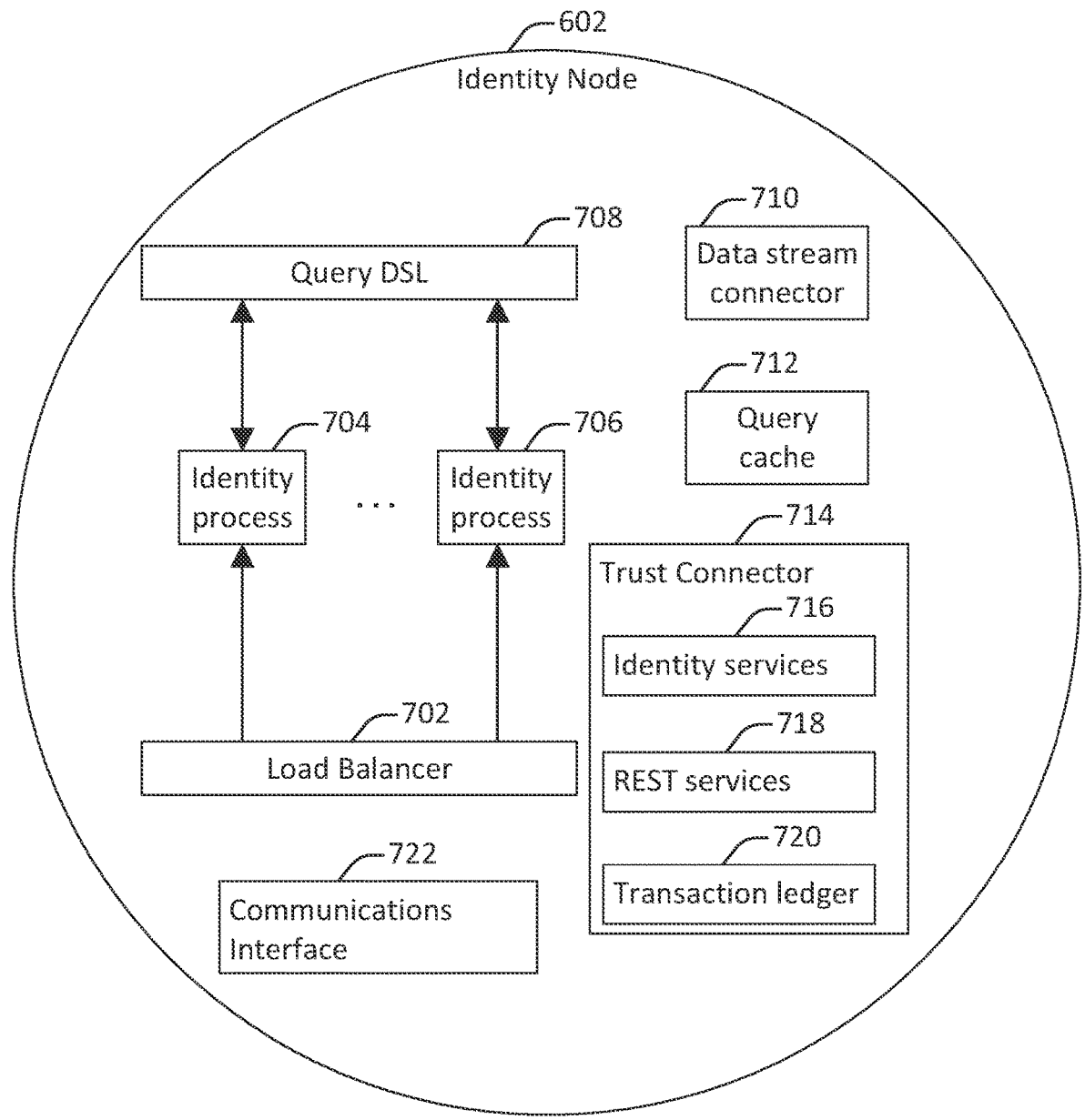
FIG. 7 illustrates an example of a method for query processing, performed in accordance with one or more embodiments.
Figure 8:
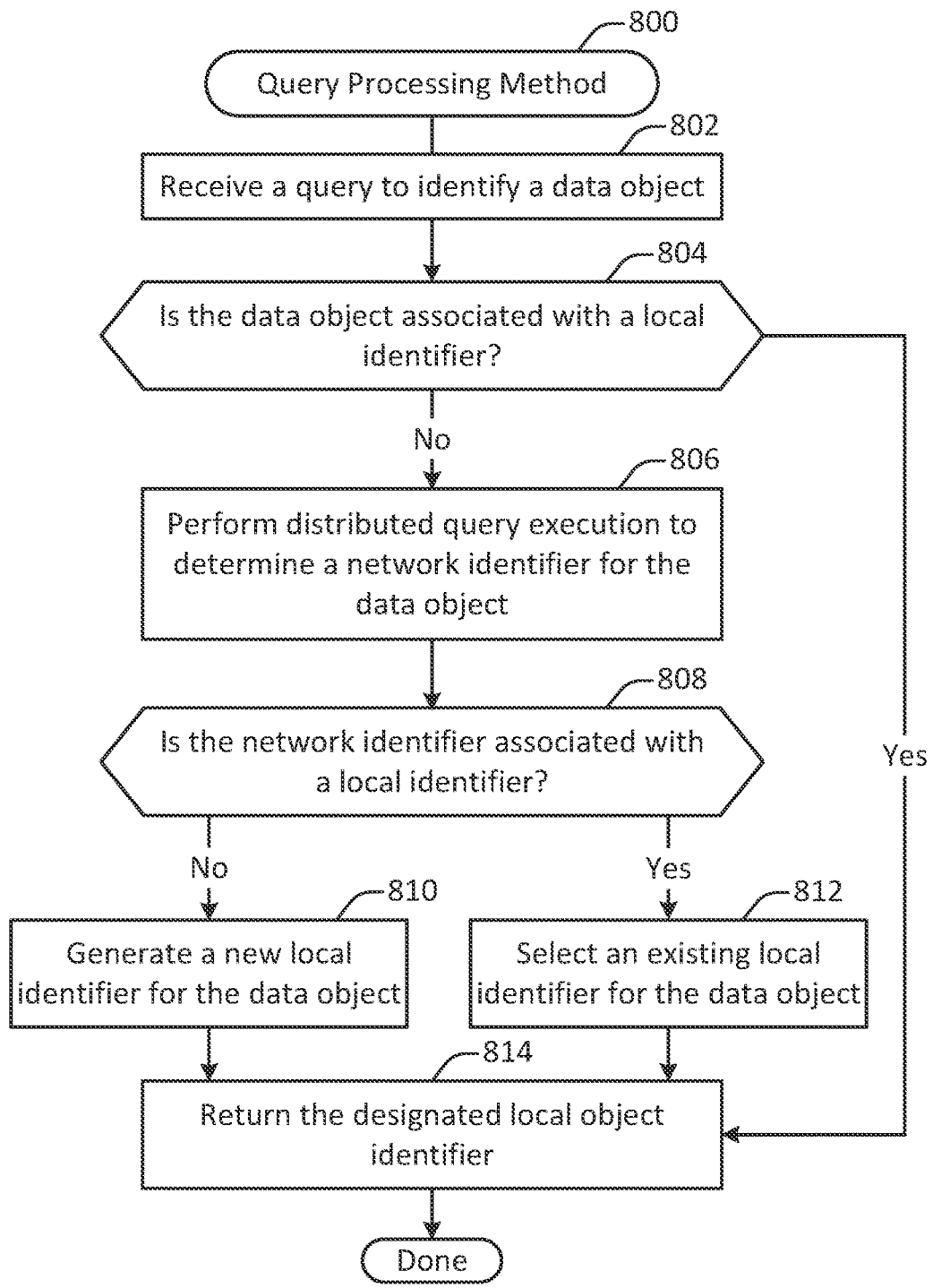
FIG. 8 illustrates an example of a method for distributed query execution, performed in accordance with one or more embodiments.

In some implementations, the query may be received at a zero-knowledge identity node associated with the campus. FIG. 7 illustrates an example of an identity node, configured in accordance with one or more embodiments. FIG. 8 illustrates an example of a method 800 for processing such a query.

At 506, the query is executed via a network of distributed identity nodes. According to various embodiments, some or all of the distributed identity nodes may each receive a copy of the query. A node that receives the query may then investigate the identity of the item represented by the query using its own local resources. After performing such an inquiry, the node may then communicate with other distributed identity nodes to resolve the identity. The communication may occur via a technique such as a gossip protocol, which is a type of peer-to-peer communication that can be used to route data to the members of a group without necessarily involving a central registry to coordinate the action. Techniques for executing a query among distributed identity nodes are discussed in additional detail with respect to the methods 900 and 1000 shown in FIGS. 9 and 10.

A local object identifier based on the executed query is determined at 508. According to various embodiments, the local object identifier provides a way for the local system that generated the query to identify the object associated with the query. The local object identifier may map to a global object identifier that is produced by the execution of the query at 506. In this way, information associated with the query may be validated against information known by other nodes in the distributed identity network without sharing information among those nodes. Techniques for determining a local object identifier are discussed in additional detail with respect to the method 800 shown in FIG. 8.

Figure 6:
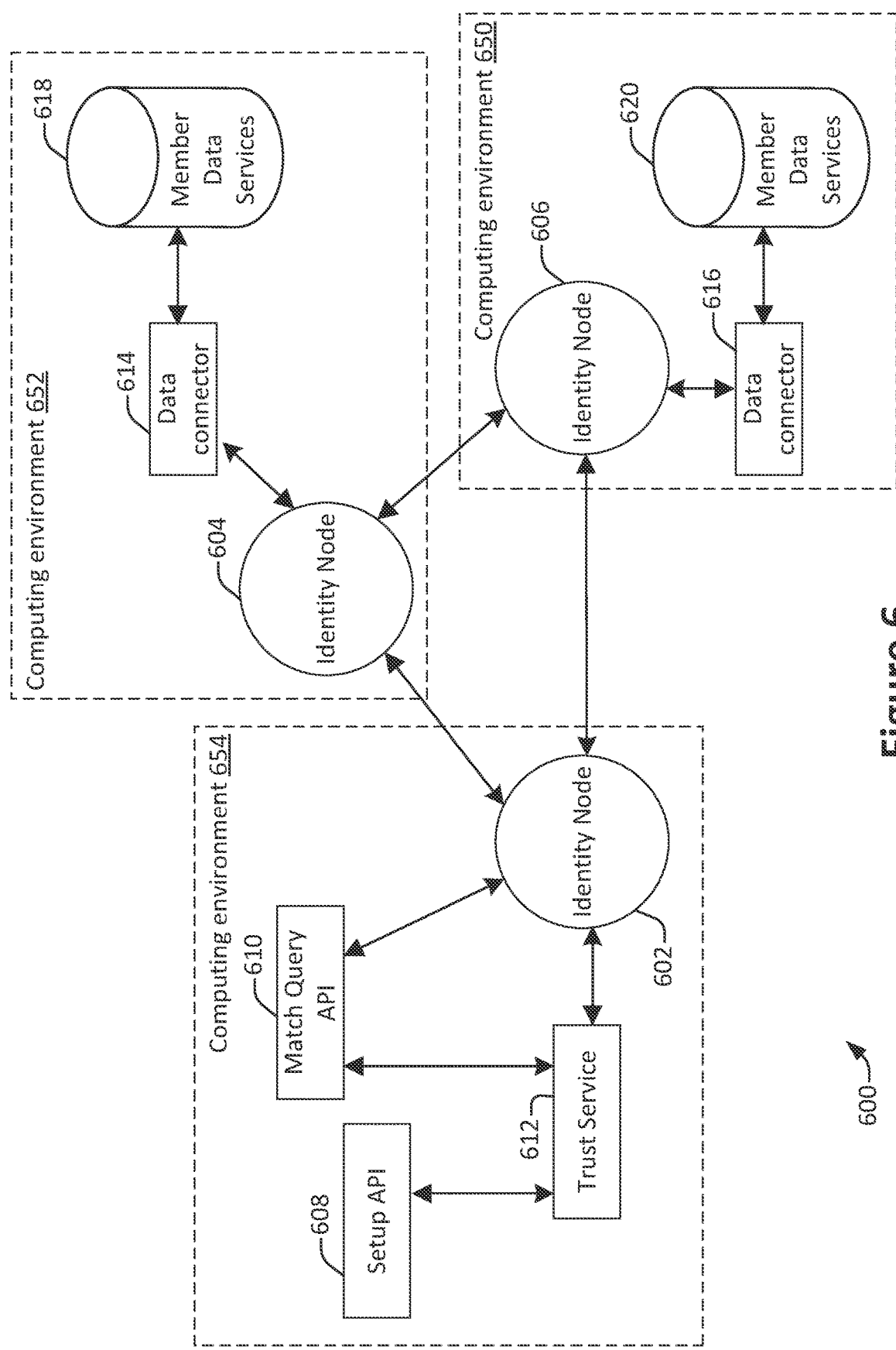
FIG. 6 illustrates an example of an identity node, configured in accordance with one or more embodiments.

FIG. 6 illustrates an example of an arrangement of components in a distributed computing system 600, configured in accordance with one or more embodiments. The distributed computing system 600 includes identity nodes 602, 604, and 606, a setup API 608, a match query API 610, a trust service 612, data connectors 614 and 616, and member data services 618 and 620.

In some implementations, the setup API 608 may be used to define metadata for zero-knowledge querying. For example, as discussed with respect to operation 502 in FIG. 5, an administrator may create a data object template that includes one or more fields to be used for identification of an instance of an item represented by the data object. Alternately, a data object template may be automatically created, for instance based on a data object type associated with data objects stored in a local database.

According to various embodiments, the trust service 612 may provide a mechanism for sharing trusted information among the identity nodes. The trust service 612 may store information such as a network identifier that uniquely identifies a data object. The trust service 612 may also store one or more data values associated with the data object. For example, in the case of a person the trust service 612 may store a user identifier as well as a name, a social security number, and one or more email addresses associated with the person. The trust service 612 may store data values for only some of the data fields associated with the object, and need not need not store data values for all fields associated with the object. For example, some fields may be used to store information that has not yet been associated with the data object within the network.

In particular embodiments, the trust service 612 may be implemented at least in part via a hashed database such as a hash tree (e.g., a Merkle tree). In such a configuration, an identity node may be able to query the database to verify that information is present and/or associated with a given identifier. For example, given a network identifier for an item such as a person and a piece of information such as a social security number, a computing system may query the trust service 612 to determine whether the network identifier is associated with the social security number.

In particular embodiments, the trust service 612 may not be used to extract information. For example, given a network identifier, a computing system may not query the trust service 612 to identify a social security number corresponding to the network identifier. Similarly, given a social security number, a computing system may not query the trust service 612 to identify a network identifier corresponding to the social security number. In this way, the hashed, one-way nature of the trust service 612 may facilitate the maintenance of information privacy while at the same time permitting information verification.

In some implementations, the setup API 608 communicates with the trust service 612. For instance, the setup API 608 may configure the trust service 612 for verifying a particular type or types of item or items.

According to various embodiments, the match query API 610 may be used to generate identity queries to transmit to the identity node 602 for execution. For example, the match query API 610 may receive information about an item to be identified. If the information includes a network identifier, then the match query API may use the network identifier to query the trust service 612 to verify the information. If instead the information does not include a network identifier, or if some of the information cannot be validated via the trust service, the match query API 610 may communicate with the identity node 602 to execute a distributed query across potentially many identity nodes.

In particular embodiments, the setup API 608 and/or the Match Query API 610 may be configured as a REST (Representational State Transfer) API. In such a configuration, entities may access the API to perform operations and access information by using a uniform and predefined set of stateless operations.

Figure 9:
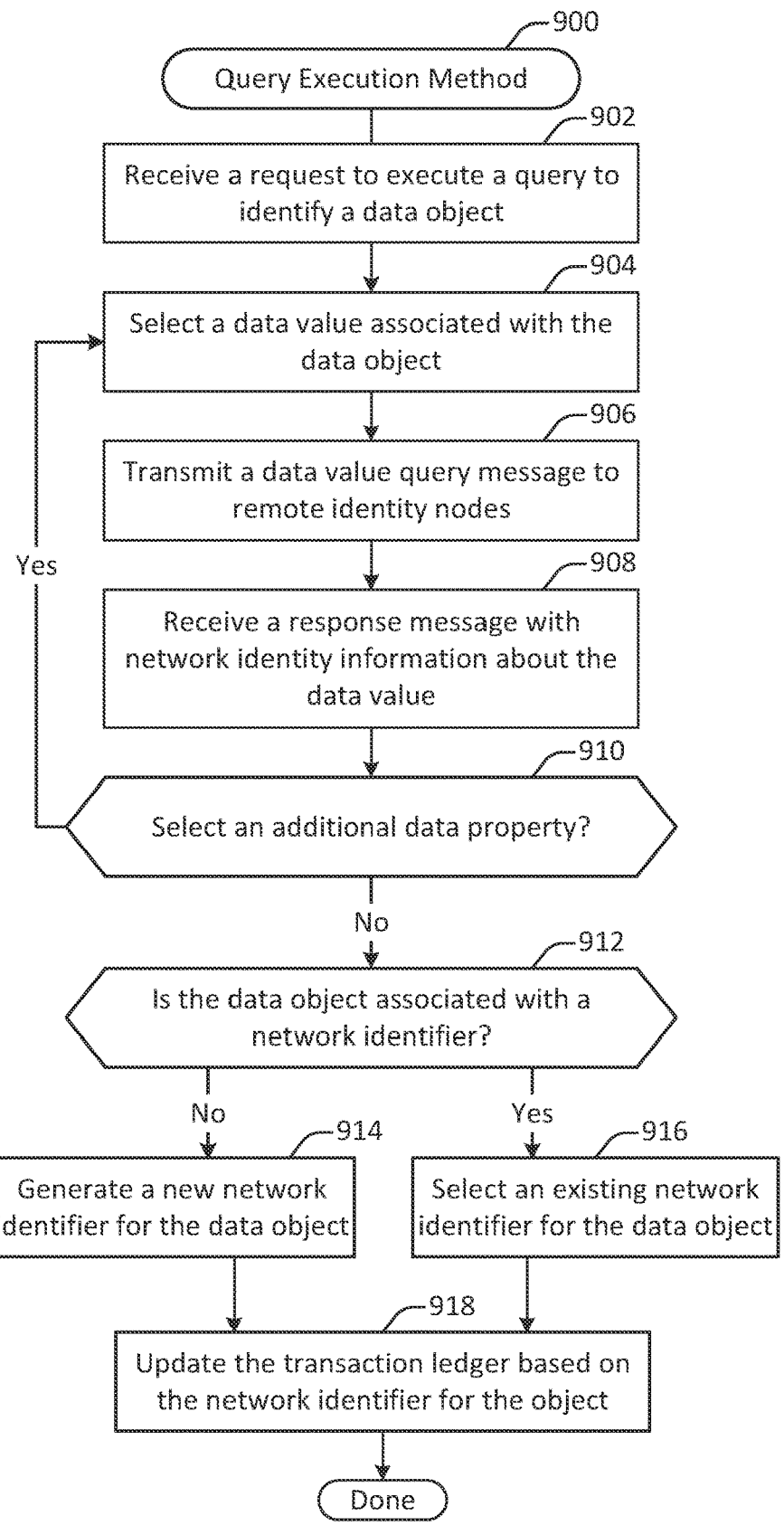
FIG. 9 illustrates an example of a method for remote query execution, performed in accordance with one or more embodiments.

According to various embodiments, each identity node is responsible for performing a variety of operations related to identity management. For example, the identity node 602 may receive identity queries from the match query API 610 and then communicate with other identity nodes to execute the query. FIG. 8 illustrates an example of a method 800 for processing a query. As another example, the identity node 602 may receive identity queries from other identity nodes and then participate in the execution of that query. FIG. 9 illustrates an example of a method 900 for executing a query.

According to various embodiments, the member data services 618 and 620 include repositories of information that may be used to identify items. Each member data service may correspond to one or more databases associated with an entity or organization. For example, member data services 618 may correspond to user accounts at Microsoft, while member data services 620 may correspond to user accounts at Google. As another example, member data services 618 may correspond to user accounts for one or more services offered by a cloud computing system, while member data services 620 may correspond to a different one or more services offered by the same cloud computing system. As still another example, member data services 618 may correspond to user accounts associated with one or more entities within a cloud computing system, while member data services 620 may correspond user accounts associated with a different one or more entities within the same cloud computing system.

According to various embodiments, computing environments 650, 652, and 654 may correspond with different entities or organizations. For example, the computing environment 650 may correspond with Microsoft, while the computing environment 652 may correspond with Google. Alternately, different computing environments may correspond with different portions of the same entity or organization.

In particular embodiments, different member data services may store different information about the same item. For example, a user may be associated with a name and an email address. However, the user's social security number may be stored in association with the user in member data services 618, while the user's home address may be stored in association with the user in member data services 620. In this example, if the user provides her social security number for storage in the computing environment 650, techniques and mechanisms described herein may allow the computing environment 650 to verify that the social security is known to correspond with the user.

In some implementations, verification may be performed while maintaining privacy and data security in other respects. For example, the computing environment 652 need not transmit the user's social security number directly to the computing environment 650. As another example, the computing environment 650 may not be able to determine which of the distributed identity nodes or other computing environments knew the user's social security number. As another example, the computing environment 650 may not be able to use the social security number to obtain other information about the user that the user did not provide to the computing environment 650.

According to various embodiments, the data connectors 614 and 616 may be used to query the member data services 618 and 620. For instance, the data connectors may provide APIs to the identity nodes for interacting with member data services. A data connector may be adapted to communicate with a specific member data services repository, since different member data services repositories may be configured differently.

In some implementations, different identity nodes may be associated with the same organizational entity. For example, a cloud computing service provider may be associated with multiple data service repositories that each maintains different identity information. These different data service repositories may be associated with different identity nodes. As another example, a single member data service repository may be associated with multiple identity nodes, for instance for load balancing.

For the purpose of illustration, the system 600 is shown as including three identity nodes and three computing environments. However, in various embodiments the system 600 may include hundreds or thousands of identity nodes and/or computing environments. Similarly, for the purpose of illustration the system 600 is shown as having data connectors and member data services in communication with the identity nodes 604 and 606, while identity node 602 is in communication with the match query API 610 and the trust service 612. However, in various embodiments any identity node may be in communication with one or more match query APIs, trust services, data connectors, setup APIs, and/or member data services. For the purpose of illustration, the system 600 is shown as having one-to-one relationships between various components. However, in various embodiments various components may be arranged in one-to-many or many-to-many relationships.

According to various embodiments, identity nodes may communicate with one another at least in part via a gossip protocol. Because digital communications networks such as the internet typically do not support multicasting a message to all members of a group at once, the number of point-to-point communication channels between nodes in a network grows with the square of the number of nodes. Gossip communication provides an alternative, probabilistic approach, working as an epidemic of information. Gossip messages spread quickly throughout the members of a network, with the number of "hops" between members on the order of log(N) to reach all network members, where N is the number of nodes.

In some implementations, gossip communication may be used to support any of a variety of operations discussed herein. For instance, gossip communication may be used to distribute either or all of query messages, consensus messages, and result messages between identity nodes. In the case of consensus messages, gossip communication can be used to facilitate consensus on potentially conflicting identity information. Gossip communication can also be used to spread the result of a query across the entire network.

FIG. 7 illustrates an example of an identity node 602, configured in accordance with one or more embodiments. The identity node 602 includes a load balancer 702, identity processes 704 through 706, a query domain-specific language (DSL) 708, a data stream connector 710, a query cache 712, and a trust connector 714. The trust connector 714 includes identity services 716, REST services 718, and a transaction ledger 720.

According to various embodiments, the identity node 602 may be implemented on one or more computing devices in a cloud computing environment. For example, the identity node 602 may be executed within a virtual machine in a cloud computing environment such as Amazon Web Services (AWS), Microsoft Azure, or Google Cloud.

According to various embodiments, the load balancer 702 divides identity query execution requests for processing among a number of different processes. FIG. 7 shows two processes 704 and 706 for the purpose of illustration. However, any suitable number of processes may be used. Each process is configured to execute one or more identity query requests. For example, a process may perform operations such as retrieving or storing information in the query cache 712, communicating with member data services via the query DSL 708 and/or data stream connector 710, communicating with the trust connector 714, and/or communicating with other identity nodes via the trust connector 714.

In some implementations, the query DSL 708 may be used to translate queries from the language common to the identity nodes to a domain-specific language for queries or Lambda functions that the client uses to connect to information. For example, Microsoft may store item information in one type of database, while Google may store item information in another type of database. The translated queries may then be sent to the member data services via the data stream connector 710.

In some embodiments, the query cache 712 may maintain a record of queries sent to the member data services along with the results of those queries. In this way, the identity node need not repeatedly query the member data services for the same information over a short time span. Instead, such information may be retrieved from the query cache 712. However, the identity node may also periodically refresh the information stored in the query cache 712 to capture changes that have occurred in the member data services. For instance, the query cache 712 may be used to limit queries for the same information to a period of once per hour, once per day, or some other time interval.

According to various embodiments, the trust connector 714 may be used to facilitate communications between the identity node 702 and the trust service 612. The identity services module 716 may be used to perform identity queries. For example, the identity services module 716 may receive a query that includes a network identifier and one or more pieces of information. The identity services module 716 may then query the transaction ledger module 720 to determine if the information is associated with the network identifier.

In some implementations, the REST services 718 may be used to update the transaction ledger 720. For instance, when it is determined that a piece of information is associated with a network identifier, the transaction ledger 720 may be updated to include a hash of the information that is associated with the network identifier. In this way, the identity services 716 may later be used to determine if the piece of information is associated with the network identifier by hashing the information and comparing it with the information stored in the ledger. In some instances, a piece of information may be disassociated with a network identifier. For instance, the piece of information may later be associated with a different and conflicting network identifier.

In some embodiments, the transaction ledger 720 may communicate with the trust service 612 to store a realized state of the transactions adding or removing information in association with various network identifiers. Such information may be modified by the REST services 718 and queried by the identity services 716. In particular embodiments, trusted information may be stored in the transaction ledger via blockchain.

According to various embodiments, the communications interface 722 may be used to support communication between the different identity nodes. For example, the identity nodes may communicate to share queries for execution, to gossip about query results, or to communicate information about the trust ledger 720.

FIG. 8 illustrates an example of a method 800 for query processing, performed in accordance with one or more embodiments. According to various embodiments, the method 800 may be performed in order to process a query to validate information about an item. The method 800 may be performed at one or more components in a computing environment, such as the computing environment 654 shown in FIG. 6.

A query to identify a data object is received at 802. In some implementations, the query may be received at the match query API 610 shown in FIG. 6. The query may include information that may be associated with a data object but that may need to be verified. For example, a website user may request to create a user account and may provide information such as a name, an email address, and a social security number.

At 804, a determination is made as to whether the data object is associated with a local identifier. In some implementations, the determination may be made by querying a database local to the computing environment 654. If all of the information associated with the query is linked to the same local identifier, then additional verification may not need to be performed. If instead some or all of the information associated with the query is not linked to a local identifier, then the information may be verified.

Distributed query execution is performed at 806 to determine a network identifier for the data object. As part of the distributed query execution, the match query API 610 may retrieve metadata from the trust service 612. The metadata may indicate information such as which fields are associated with the data object. The match query API 610 may use this information to formulate the query or queries. The query or queries may then be distributed to identity nodes throughout the network. Additional details regarding distributed query execution are discussed with respect to the methods 900 and 1000 shown in FIGS. 9 and 10.

In some instances, distributed query execution need not be performed for one or more data values. For example, one or more data values may be validated based on communication with the trust ledger, for instance when the information associated with the data object is already stored in the trust ledger. Alternately, or additionally, the query execution process may involve one or more queries to member data services, for instance when some or all of the information associated with the data object is not yet stored in the trust ledger.

A determination is made at 808 as to whether the network identifier is associated with a local identifier. The match query API 610 may maintain a correspondence table between network identifiers stored in the transaction ledger and known to the trust service 612, and local identifiers that identify data objects within the local computing environment. For example, a person may have a network identifier that identifies the person within the trust ledger, and a local identifier for each computing environment in which the person has an account.

If the network identifier is not associated with a local identifier, then a new network identifier may be generated at 810. If instead the network identifier is already associated with a local identifier, then the existing local identifier is selected at 812. According to various embodiments, generating a new local identifier may involve one or more of a variety of operations. For example, a new local user account or other object representation may be created. As another example, a new entry may be created in the correspondence table discussed with respect to operation 808.

At 814, the designated local identifier is returned. The designated local identifier may then be used by the computing environment to perform further processing. In some implementations, the method 800 may also return an indication as to which pieces of information associated with the data object have been verified. For example, the system may be able to verify a social security number associated with a user account, but not an address. In some instances, a lack of verification may prompt the computing environment to require additional information from the user, such as supporting evidence for the information. Alternately, or additionally, the computing environment may simply treat some information as unverified.

FIG. 9 illustrates an example of a method 900 for distributed query execution, performed in accordance with one or more embodiments. According to various embodiments, the method 900 may be performed at one or more components within a computing system, such as the identity node 602 shown in FIG. 6.

At 902, a request to execute a query to identify a data object is received. In some implementations, the request may be generated as part of a query processing method such as the method 800 shown in FIG. 8. For example, the request may be generated at operation 806. The request may include information such as one or more data values associated with the data object.

A data value associated with the data object is selected at 904. According to various embodiments, the data values may be selected in any suitable order, such as in sequence, at random, or in parallel.

A data value query message is transmitted to one or more remote identity nodes at 906. In some implementations, the data value query message may be transmitted to all of the identity nodes. Alternately, the data value query message may be transmitted to only a portion of the identity nodes.

In particular embodiments, the data value query message may be batched and/or interleaved with other data value query messages. In this way, a recipient of the data value query message may be unable to correlate the messages to determine from the messages alone that different data values are associated with the same data object. Thus, the transmission of the data value query messages to the remote identity nodes may occur in an order different than that shown in FIG. 9. For example, batches of data value query messages may be transmitted at regular intervals (e.g., once per second, once per millisecond, once per minute, etc.) or when a designated number of such requests have been received.

In some implementations, the data value query message may include only a limited amount of information. For example, the data value query message may identify only the type of data object and type of data value associated with the query.

In some implementations, the data value query message may be transmitted in such a way that the origin of the data value query message is disguised. For example, the identity nodes may employ a gossip protocol to transmit messages, and the data value query message may be transmitted along with the retransmission of other messages received from other identity nodes.

A response message with network identity information about the data value is received at 908. According to various embodiments, the response message may identify a network identifier associated with the data value if one exists. Alternately, or additionally, the response message may indicate that the data value is not associated with an existing network identifier. The network identity information may be determined via a distributed process involving a plurality of identity nodes. Additional details regarding such a process are discussed with respect to the method 1000 shown in FIG. 10.

A determination is made at 910 as to whether to select an additional data property. As discussed with respect to the operation 904, data properties may be selected for querying in any suitable order.

A determination is made be made at 912 as to whether the data object is associated with one or more existing network identifiers. In some implementations, the determination may involve determining whether any of the response messages received at 908 include a network identifier associated with any one of the data values selected at 904.

If the data object is not associated with an existing network identifier, then a new network identifier for the data object is generated at 914. According to various embodiments, the new network identifier may then be associated with some or all of the information associated with the data objects.

In some embodiments, the new network identifier may be associated only with those data values that have been independently verified. For example, the new network identifier may be associated with an email address that has been verified by transmitting a verification email, to which the user responds to clicking a link or transmitting a response.

If the data object is associated with an existing network identifier, then an existing network identifier is selected for the data object at 916. In some situations, only a single network identifier may be identified. For example, only a single data value may have been selected at 904 for verification. As another example, multiple data values may have been selected at 904, but the response message for each data value received at 908 may have indicated the same network identifier as being associated with the different data values.

In some implementations, more than one network identifier may be identified. For example, a person's address may be associated with one network identifier, while the person's social security number may be associated with a different network identifier, for instance if the address and social security number had never been linked in a single account. In such a situation, the system may select one of the network identifiers to use, such as the network identifier that was identified as being associated with the greatest number of data values.

At 918, the transaction ledger is updated based on the network identifier for the object. According to various embodiments, the transaction ledger may be updated to include the new network identifier generated at 914 or the network identifier selected at 914. In particular embodiments, updating the transaction ledger to reflect the query result may allow the system to resolve conflicts in an automated, self-healing manner. Over time, successive verification queries for conflicted information may lead the system to converge on a network identifier for the data object. Then, conflicting network identifiers that are associated with only a small portion of data values associated with the object may be removed.

Figure 10:
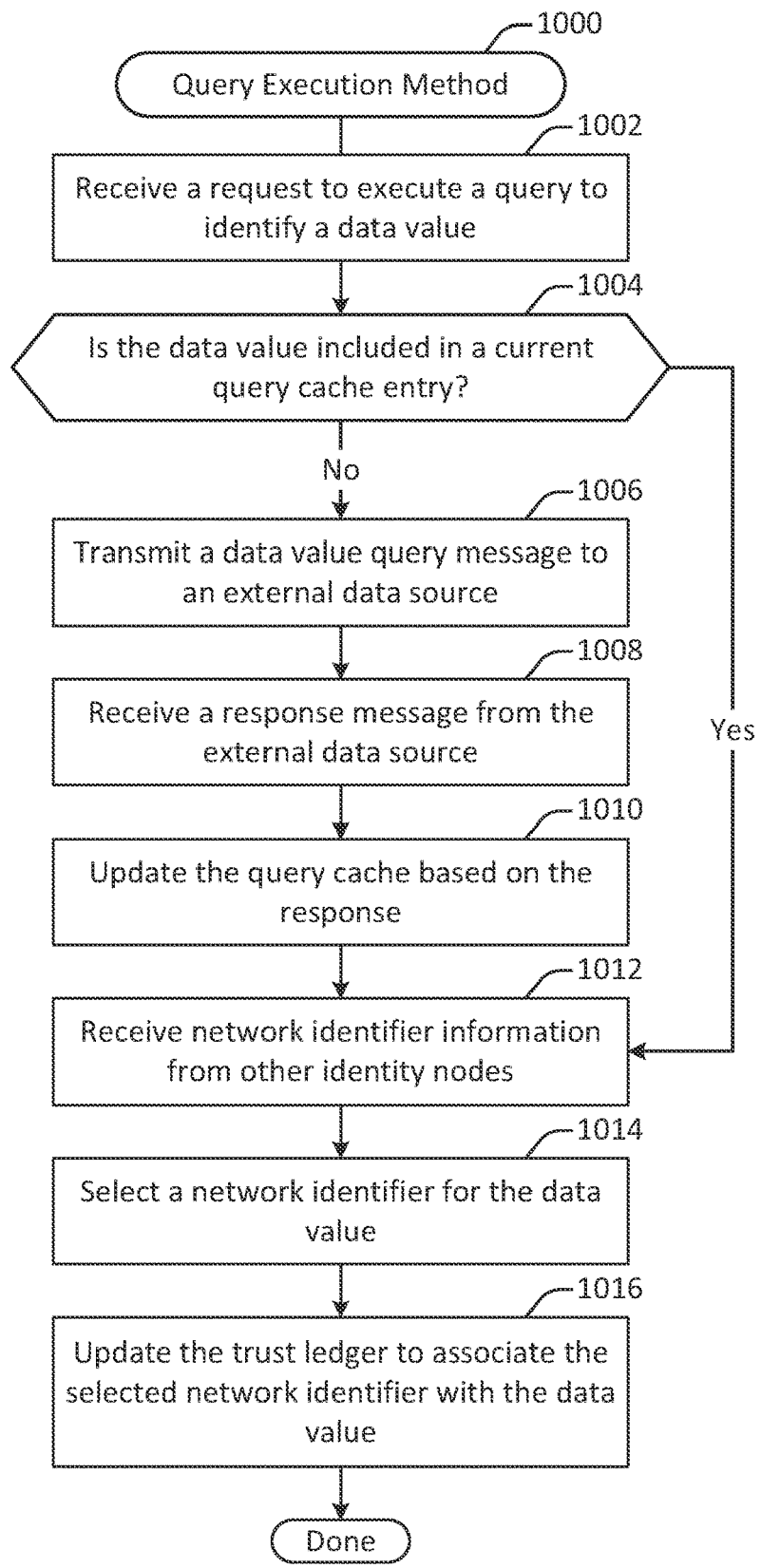
FIG. 10 shows a block diagram of an example of an environment that includes an on-demand database service configured in accordance with some implementations.

FIG. 10 illustrates an example of a method 1000 for remote query execution, performed in accordance with one or more embodiments. According to various embodiments, the method 1000 may be executed on an identity node in the network.

In particular embodiments, the method 1000 may be performed at a selected one of the identity nodes that has been elected as a "leader" to determine a consensus as to the network identifier based on the distributed queries run by various identity nodes in the system. For example, the leader node may be elected by computing a hash of the data value and consulting a correspondence table that links hash values to leaders. Alternately, any suitable election mechanism may be employed.

In some implementations, some or all of the operations described with respect to FIG. 10 may be executed for each of the queried data values on some or all of the identity nodes in the network. For instance, the identity node on which the method 1000 is executed may be the local identity node on which the query is initially received, or it may be a remote identity node located elsewhere in the network.

At 1002 a request is received to execute a query to identify a data value. According to various embodiments, the request may be generated as discussed with respect to the operation 906 shown in FIG. 9.

A determination is made at 1004 as to whether the data value is included in a current query cache entry. According to various embodiments, the query cache may store queries and query results received from the member data services to avoid repeatedly querying the member data services for the same information over a short time span. Each query result may identify, for example, a data value associated with a data object and a network identifier associated with that data value.

In some implementations, the query cache may include an entry for the data value, but the entry may be outdated. In such a situation, the system may ignore the query cache entry and communicate with the member data services to refresh the query.

A data value query message is transmitted to an external data source at 1006. According to various embodiments, the external data source may be a member data services repository such as the repository 618 discussed with respect to FIG. 6. The data value query message may identify the data value and the object type with which the data value is associated.

In some implementations, the data value query message may be transmitted via the query DSL 708 and the data stream connector 710. The query DSL 708 may convert the query into a language specific to the focal member data services repository, while the data stream connector 710 may facilitate the communication between the identity node and the member data services repository.

A response message from the external data source is received at 1008. In some implementations, the response message may indicate whether the data value is known to the member data services as being associated with a network identifier. If such an identifier is located, then it may be included in the response message. Otherwise, the response message may include an indication that no such identifier was found.

In particular embodiments, the network identifier may be determined by the member data services querying a database to identify a local identifier associated with the data value. The local identifier may then be used to query a correspondence table that identifies a correspondence between local identifiers and network identifiers. If a corresponding network identifier is found, then it may be included with the response received at 1008.

The query cache is updated at 1010 based on the response. Updating the query cache may involve storing information such as the query sent to the external data source, the date and time at which the query was sent, and the response received from the external data source, including any network identifier associated with the data value.

Network identifier information is received from other identity nodes at 1012. According to various embodiments, the network identifier information may include one or more network identifiers associated with the data value and identified by identity nodes other than the node on which the method 1000 is executed.

At 1014, a network identifier is selected for the data value. In some implementations, the network identifier may be selected based on consensus. For example, the network identifier received from the greatest number of identity nodes may be selected. As another example, another selection mechanism may be used. For instance, the responses from different identity nodes may be weighted differently, and a weighted average used to select the consensus network identifier. The weighting scheme may depend at least in part based on the query parameters. For instance, if a university seeks to identify a new student at campus A, and the student claims to be already enrolled at campus B, then the identity node at campus B may be upweighted when determining the consensus. In some implementations, identity nodes may communicate using Command Query Responsibility Segregation (CQRS) patterns.

The trust ledger is updated at 1016 to associate the selected network identifier with the data value. According to various embodiments, updating the trust ledger may involve communicating with the REST services 718. The REST services 718 may then hash the data value and store the hashed value in the transaction layer in association with the selected network identifier.

In particular embodiments, one or more of the operations shown in FIG. 10 may not be performed by some or all identity nodes. For example, a node not elected as the leader may not perform operations 1012-616, and may instead transmit network identity information to the leader.

According to various embodiments, one or more of the techniques and mechanisms described with respect to FIGS. 8-9 or elsewhere herein may be implemented as a continuous workflow. For example, an identity node that has critical information required to identify an unknown item may be down during an attempted query execution for that item. As another example, the member services associated with an identity node may have updated information, rendering a previously-generated response to a query inaccurate. To address such situations, identity nodes may interact in an asynchronous, event-oriented fashion in the form of a continuous workflow, rather than a request/response.

In particular embodiments, a continuous workflow may involve operations such as periodically refreshing results stored in a query cache. When such an operation changes the value stored in the cache, the identity node on which the cache is located may transmit one or more messages to re-execute an identity query for the relevant data value across the network of identity nodes.

In particular embodiments, a continuous workflow may involve operations such as executing queries asynchronously. For instance, in some configurations the identity nodes may take quite a while to come to a consensus about the identity of an item. Accordingly, communication across the network may be conducted in an asynchronous manner.

Figure 11:
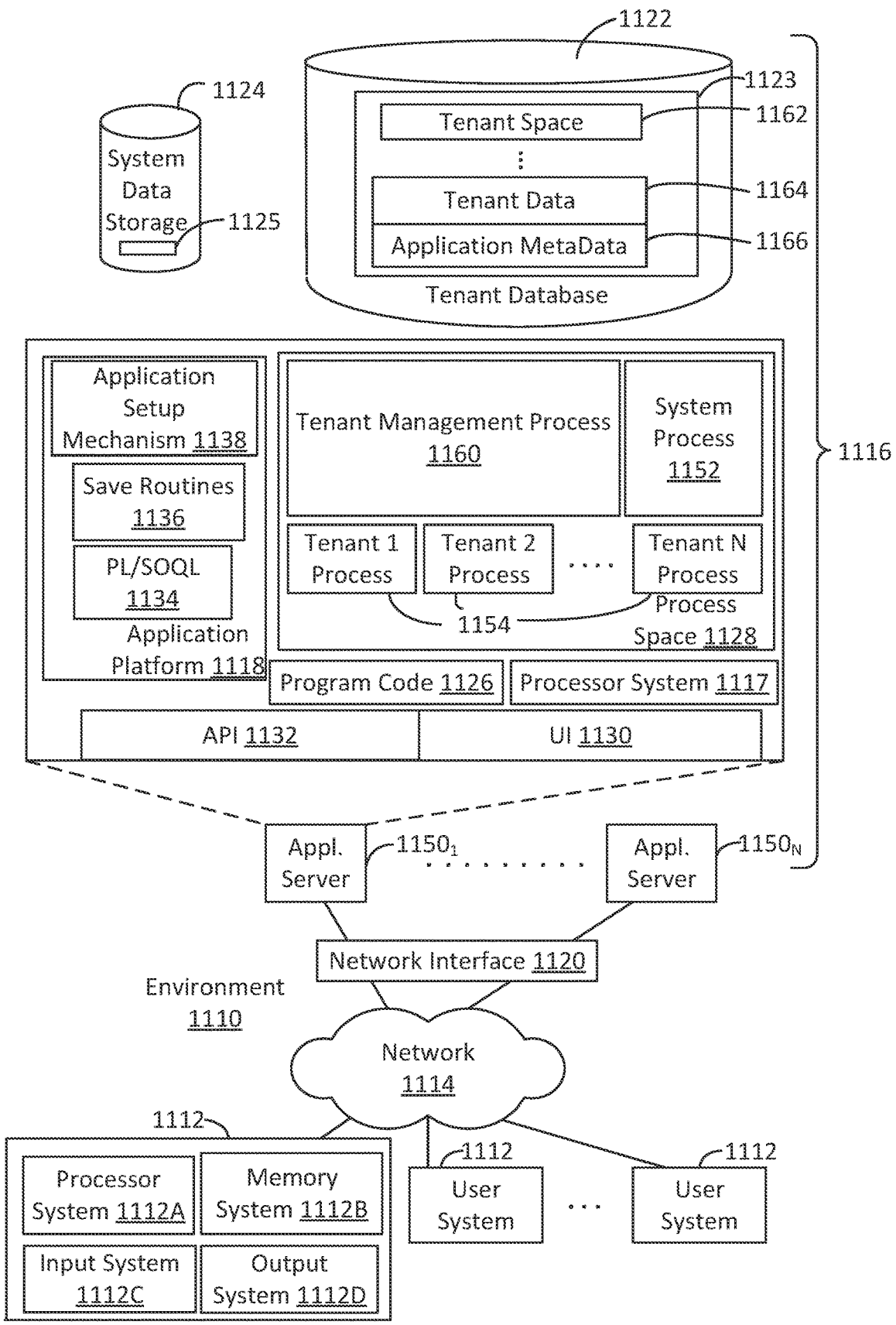
FIG. 11 shows a block diagram of an example of an environment that includes an on-demand database service configured in accordance with some implementations.

FIG. 11 shows a block diagram of an example of an environment 1110 that includes an on-demand database service configured in accordance with some implementations. Environment 1110 may include user systems 1112, network 1114, database system 1116, processor system 1117, application platform 1118, network interface 1120, tenant data storage 1122, tenant data 1123, system data storage 1124, system data 1125, program code 1126, process space 1128, User Interface (UI) 1130, Application Program Interface (API) 1132, PL/SOQL 1134, save routines 1136, application setup mechanism 1138, application servers 1150-1 through 1150-N, system process space 1152, tenant process spaces 1154, tenant management process space 1160, tenant storage space 1162, user storage 1164, and application metadata 1166. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1116, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1118 may be a framework that allows the creation, management, and execution of applications in system 1116. Such applications may be developed by the database service provider or by users or third-party application developers accessing the service. Application platform 1118 includes an application setup mechanism 1138 that supports application developers' creation and management of applications, which may be saved as metadata into tenant data storage 1122 by save routines 1136 for execution by subscribers as one or more tenant process spaces 1154 managed by tenant management process 1160 for example. Invocations to such applications may be coded using PL/SOQL 1134 that provides a programming language style interface extension to API 1132. A detailed description of some PL/SOQL language implementations is discussed in commonly assigned U.S. Pat. No. 11,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 6010, and hereby incorporated by reference in its entirety and for all purposes. Invocations to applications may be detected by one or more system processes. Such system processes may manage retrieval of application metadata 1166 for a subscriber making such an invocation. Such system processes may also manage execution of application metadata 1166 as an application in a virtual machine.

In some implementations, each application server 1150 may handle requests for any user associated with any organization. A load balancing function (e.g., an F5 Big-IP load balancer) may distribute requests to the application servers 1150 based on an algorithm such as least-connections, round robin, observed response time, etc. Each application server 1150 may be configured to communicate with tenant data storage 1122 and the tenant data 1123 therein, and system data storage 1124 and the system data 1125 therein to serve requests of user systems 1112. The tenant data 1123 may be divided into individual tenant storage spaces 1162, which can be either a physical arrangement and/or a logical arrangement of data. Within each tenant storage space 1162, user storage 1164 and application metadata 1166 may be similarly allocated for each user. For example, a copy of a user's most recently used (MRU) items might be stored to user storage 1164. Similarly, a copy of MRU items for an entire tenant organization may be stored to tenant storage space 1162. A UI 1130 provides a user interface and an API 1132 provides an application programming interface to system 1116 resident processes to users and/or developers at user systems 1112.

System 1116 may implement a web-based information verification system. For example, in some implementations, system 1116 may include application servers configured to implement and execute identity verification software applications. The application servers may be configured to provide related data, code, forms, web pages and other information to and from user systems 1112. Additionally, the application servers may be configured to store information to, and retrieve information from a database system. Such information may include related data, objects, and/or Webpage content. With a multi-tenant system, data for multiple tenants may be stored in the same physical database object in tenant data storage 1122, however, tenant data may be arranged in the storage medium(s) of tenant data storage 1122 so that data of one tenant is kept logically separate from that of other tenants. In such a scheme, one tenant may not access another tenant's data, unless such data is expressly shared.

Several elements in the system shown in FIG. 11 include conventional, well-known elements that are explained only briefly here. For example, user system 1112 may include processor system 1112A, memory system 1112B, input system 1112C, and output system 11 13D. A user system 1112 may be implemented as any computing device(s) or other data processing apparatus such as a mobile phone, laptop computer, tablet, desktop computer, or network of computing devices. User system 13 may run an internet browser allowing a user (e.g., a subscriber of an MTS) of user system 1112 to access, process and view information, pages and applications available from system 1116 over network 1114. Network 1114 may be any network or combination of networks of devices that communicate with one another, such as any one or any combination of a LAN (local area network), WAN (wide area network), wireless network, or other appropriate configuration.

The users of user systems 1112 may differ in their respective capacities, and the capacity of a particular user system 1112 to access information may be determined at least in part by "permissions" of the particular user system 1112. As discussed herein, permissions generally govern access to computing resources such as data objects, components, and other entities of a computing system, such as an identity verification system, a social networking system, and/or a CRM database system. "Permission sets" generally refer to groups of permissions that may be assigned to users of such a computing environment. For instance, the assignments of users and permission sets may be stored in one or more databases of System 1116. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1116 may provide on-demand database service to user systems 1112 using an MTS arrangement. By way of example, one tenant organization may be a company that employs a sales force where each salesperson uses system 1116 to manage their sales process. Thus, a user in such an organization may maintain contact data, leads data, customer follow-up data, performance data, goals and progress data, etc., all applicable to that user's personal sales process (e.g., in tenant data storage 1122). In this arrangement, a user may manage his or her sales efforts and cycles from a variety of devices, since relevant data and applications to interact with (e.g., access, view, modify, report, transmit, calculate, etc.) such data may be maintained and accessed by any user system 1112 having network access.

When implemented in an MTS arrangement, system 1116 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1116 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1116 may also maintain system-level data usable by multiple tenants or other data. Such system-level data may include industry reports, news, postings, and the like that are sharable between tenant organizations.

In some implementations, user systems 1112 may be client systems communicating with application servers 1150 to request and update system-level and tenant-level data from system 1116. By way of example, user systems 1112 may send one or more queries requesting data of a database maintained in tenant data storage 1122 and/or system data storage 1124. An application server 1150 of system 1116 may automatically generate one or more SQL statements (e.g., one or more SQL queries) that are designed to access the requested data. System data storage 1124 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In particular embodiments, entity tables may correspond to objects that may be verified according to techniques and mechanisms described herein. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 8,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 12A:
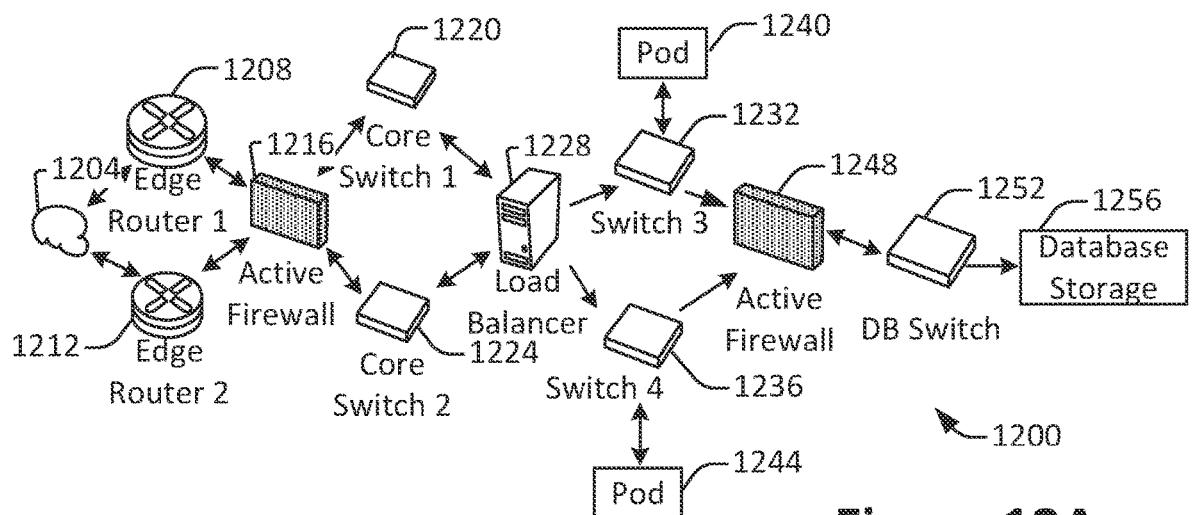
FIG. 12A shows a system diagram of an example of architectural components of an on-demand database service environment, configured in accordance with some implementations.

FIG. 12A shows a system diagram of an example of architectural components of an on-demand database service environment 1200, configured in accordance with some implementations. A client machine located in the cloud 1204 may communicate with the on-demand database service environment via one or more edge routers 1208 and 1212. A client machine may include any of the examples of user systems ?12 described above. The edge routers 1208 and 1212 may communicate with one or more core switches 1220 and 1224 via firewall 1216. The core switches may communicate with a load balancer 1228, which may distribute server load over different pods, such as the pods 1240 and 1244 by communication via pod switches 1232 and 1236. The pods 1240 and 1244, which may each include one or more servers and/or other computing resources, may perform data processing and other operations used to provide on-demand services. Components of the environment may communicate with a database storage 1256 via a database firewall 1248 and a database switch 1252.

Accessing an on-demand database service environment may involve communications transmitted among a variety of different components. The environment 1200 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 12A and 12B.

The cloud 1204 refers to any suitable data network or combination of data networks, which may include the Internet. Client machines located in the cloud 1204 may communicate with the on-demand database service environment 1200 to access services provided by the on-demand database service environment 1200. By way of example, client machines may access the on-demand database service environment 1200 to retrieve, store, edit, and/or process identity verification information.

In some implementations, the edge routers 1208 and 1212 route packets between the cloud 1204 and other components of the on-demand database service environment 1200. The edge routers 1208 and 1212 may employ the Border Gateway Protocol (BGP). The edge routers 1208 and 1212 may maintain a table of IP networks or 'prefixes', which designate network reachability among autonomous systems on the internet.

In one or more implementations, the firewall 1216 may protect the inner components of the environment 1200 from internet traffic. The firewall 1216 may block, permit, or deny access to the inner components of the on-demand database service environment 1200 based upon a set of rules and/or other criteria. The firewall 1216 may act as one or more of a packet filter, an application gateway, a stateful filter, a proxy server, or any other type of firewall.

In some implementations, the core switches 1220 and 1224 may be high-capacity switches that transfer packets within the environment 1200. The core switches 1220 and 1224 may be configured as network bridges that quickly route data between different components within the on-demand database service environment. The use of two or more core switches 1220 and 1224 may provide redundancy and/or reduced latency.

In some implementations, communication between the pods 1240 and 1244 may be conducted via the pod switches 1232 and 1236. The pod switches 1232 and 1236 may facilitate communication between the pods 1240 and 1244 and client machines, for example via core switches 1220 and 1224. Also or alternatively, the pod switches 1232 and 1236 may facilitate communication between the pods 1240 and 1244 and the database storage 1256. The load balancer 1228 may distribute workload between the pods, which may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248, which may act as a computer application firewall operating at the database application layer of a protocol stack. The database firewall 1248 may protect the database storage 1256 from application attacks such as structure query language (SQL) injection, database rootkits, and unauthorized information disclosure. The database firewall 1248 may include a host using one or more forms of reverse proxy services to proxy traffic before passing it to a gateway router and/or may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, the database storage 1256 may be an on-demand database system shared by many different organizations. The on-demand database service may employ a single-tenant approach, a multi-tenant approach, a virtualized approach, or any other type of database approach. Communication with the database storage 1256 may be conducted via the database switch 1252. The database storage 1256 may include various software components for handling database queries. Accordingly, the database switch 1252 may direct database queries transmitted by other components of the environment (e.g., the pods 1240 and 1244) to the correct components within the database storage 1256.

Figure 12B:
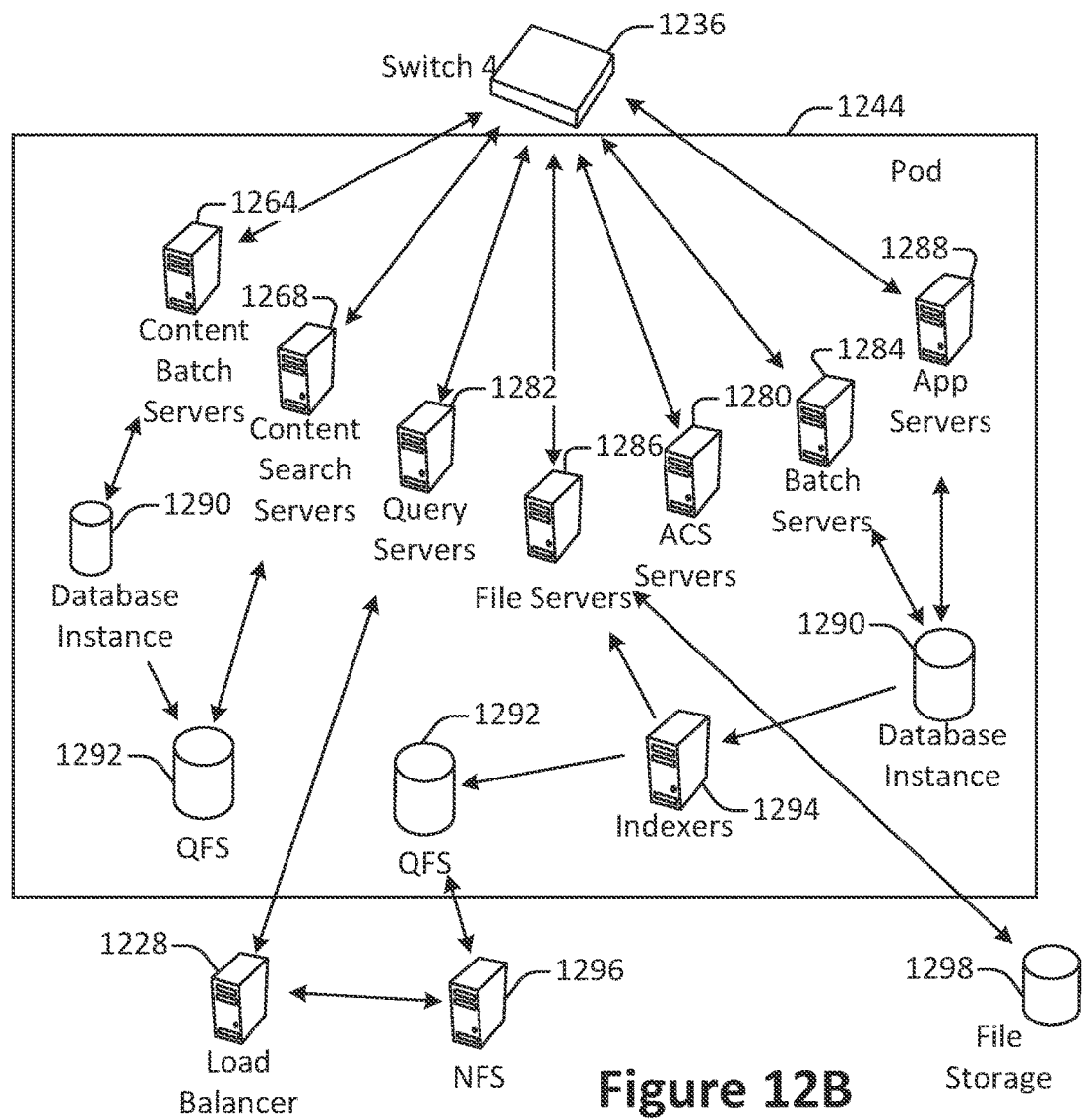
FIG. 12B shows a system diagram further illustrating an example of architectural components of an on-demand database service environment, in accordance with some implementations.

FIG. 12B shows a system diagram further illustrating an example of architectural components of an on-demand database service environment, in accordance with some implementations. The pod 1244 may be used to render services to user(s) of the on-demand database service environment 1200. The pod 1244 may include one or more content batch servers 1264, content search servers 1268, query servers 1282, file servers 1286, access control system (ACS) servers 1280, batch servers 1284, and app servers 1288. Also, the pod 1244 may include database instances 1290, quick file systems (QFS) 1292, and indexers 1294. Some or all communication between the servers in the pod 1244 may be transmitted via the switch 1236.

In some implementations, the app servers 1288 may include a framework dedicated to the execution of procedures (e.g., programs, routines, scripts) for supporting the construction of applications provided by the on-demand database service environment 1200 via the pod 1244. One or more instances of the app server 1288 may be configured to execute all or a portion of the operations of the services described herein.

In some implementations, as discussed above, the pod 1244 may include one or more database instances 1290. A database instance 1290 may be configured as an MTS in which different organizations share access to the same database, using the techniques described above. Database information may be transmitted to the indexer 1294, which may provide an index of information available in the database 1290 to file servers 1286. The QFS 1292 or other suitable filesystem may serve as a rapid-access file system for storing and accessing information available within the pod 1244. The QFS 1292 may support volume management capabilities, allowing many disks to be grouped together into a file system. The QFS 1292 may communicate with the database instances 1290, content search servers 1268 and/or indexers 1294 to identify, retrieve, move, and/or update data stored in the network file systems (NFS) 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information over a network in a manner similar to how local storage is accessed. Queries from the query servers 1222 may be transmitted to the NFS 1296 via the load balancer 1228, which may distribute resource requests over various resources available in the on-demand database service environment 1200. The NFS 1296 may also communicate with the QFS 1292 to update the information stored on the NFS 1296 and/or to provide information to the QFS 1292 for use by servers located within the pod 1244.

In some implementations, the content batch servers 1264 may handle requests internal to the pod 1244. These requests may be long-running and/or not tied to a particular customer, such as requests related to log mining, cleanup work, and maintenance tasks. The content search servers 1268 may provide query and indexer functions such as functions allowing users to search through content stored in the on-demand database service environment 1200. The file servers 1286 may manage requests for information stored in the file storage 1298, which may store information such as documents, images, basic large objects (BLOBs), etc. The query servers 1282 may be used to retrieve information from one or more file systems. For example, the query system 1282 may receive requests for information from the app servers 1288 and then transmit information queries to the NFS 1296 located outside the pod 1244. The ACS servers 1280 may control access to data, hardware resources, or software resources called upon to render services provided by the pod 1244. The batch servers 1284 may process batch jobs, which are used to run tasks at specified times. Thus, the batch servers 1284 may transmit instructions to other servers, such as the app servers 1288, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE©, DB2® by IBM and the like without departing from the scope of present disclosure.

Figure 13:
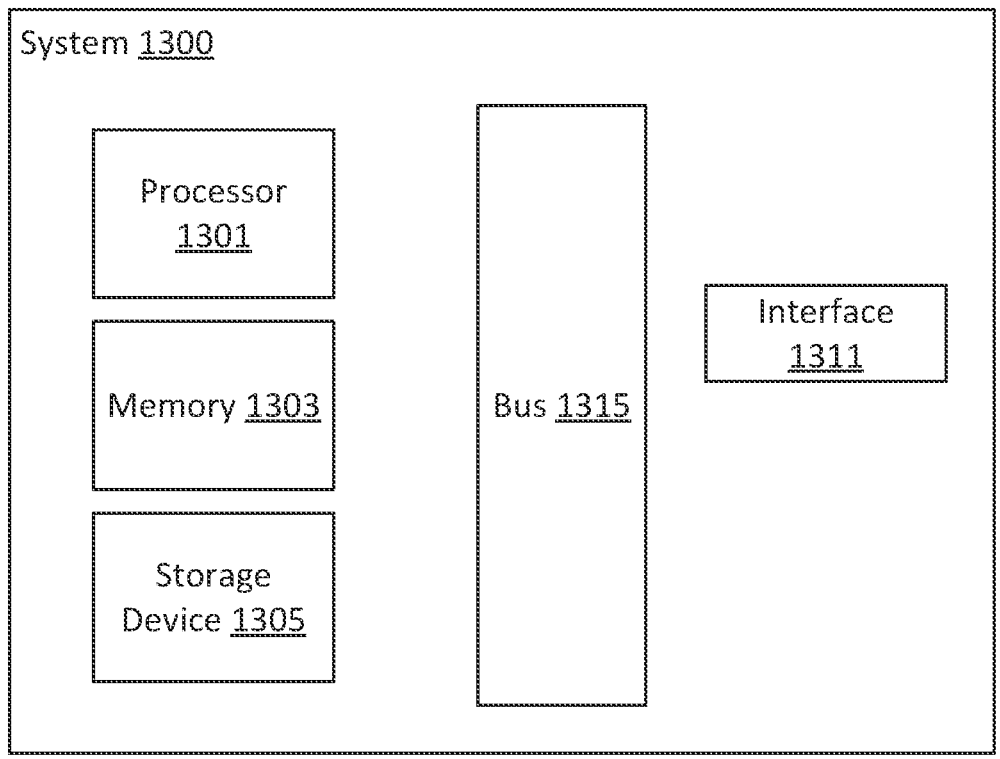
FIG. 13 illustrates one example of a computing device, configured in accordance with one or more embodiments.

FIG. 13 illustrates one example of a computing device. According to various embodiments, a system 1300 suitable for implementing embodiments described herein includes a processor 1301, a memory module 1303, a storage device 1305, an interface 1311, and a bus 1315 (e.g., a PCI bus or other interconnection fabric.) System 1300 may operate as variety of devices such as an application server, a database server, or any other device or service described herein. Although a particular configuration is described, a variety of alternative configurations are possible. The processor 1301 may perform operations such as those described herein. Instructions for performing such operations may be embodied in the memory 1303, on one or more non-transitory computer readable media, or on some other storage device. Various specially configured devices can also be used in place of or in addition to the processor 1301. The interface 1311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
receiving at a service system a request to present a digital content item at a client machine associated with a designated network identifier;
for each of a plurality of preference characteristics, transmitting a respective characteristic query message via a network to a respective plurality of identity nodes via a gossip communication protocol defining a peer-to-peer procedure for transmitting information among the plurality of identity nodes;
for each of the plurality of preference characteristics, receiving a respective preference identification response message that includes a respective preference value corresponding with the respective preference characteristic and determined based on consensus among a subset of the plurality of identity nodes, the subset of the plurality of identity nodes being in agreement about the respective preference characteristic which indicates a respective preference associated with a user linked with the designated network identifier, wherein the designated network identifier is stored in a trust ledger shared among the plurality of identity nodes;
selecting via a processor the digital content item based at least in part on the preference values; and
transmitting to the client machine a message including an instruction to present the digital content item.

2. The method recited in claim 1, wherein the digital content item is selected based at least in part on publicly available transaction information stored in a public trust ledger.

3. The method recited in claim 2, wherein the publicly available transaction information includes one or more fungible or non-fungible tokens stored in a wallet owned by a public trust ledger account associated with the designated network identifier.

4. The method recited in claim 1, wherein the request is received at a metaverse provider, and wherein the digital content item is presented at the client machine within a virtual reality experience shared across a plurality of client machines.

5. The method recited in claim 1, wherein the designated network identifier is associated with a plurality of identification data values and a data object schema, the data object schema identifying one or more data fields associated with an instance of the data object schema, each of the identification data values corresponding with a respective one of the data fields.

6. The method recited in claim 5, wherein the respective one or more data values are hashed prior to storing in the trust ledger, the trust ledger capable of being queried to determine any network identifiers associated with a designated hashed data value.

7. The method recited in claim 5, wherein the plurality of identity nodes collectively form a distributed identity network capable of validating an identity claim that includes the plurality of identification data values without divulging an origin of information used to validate the identity claim.

8. The method recited in claim 1, wherein the trust ledger is implemented as a blockchain.

9. The method recited in claim 1, wherein a first one of the plurality of identity nodes is associated with a distributed customer relations management provider that provides customer relations management services to a plurality of entities via the internet, and wherein the first identity node transmits a first preference identification response message that includes a first preference value determined based on customer relations management data stored with the distributed customer relations management provider.

10. The method recited in claim 1, wherein a first one of the plurality of identity nodes is associated with a physical retail provider service provider, and wherein the first identity node transmits a first preference identification response message that includes a first preference value determined based on a physical good selected by a user associated with the designated network identifier.

11. The method recited in claim 1, wherein a first one of the plurality of identity nodes is associated with a digital retail provider service provider, and wherein the first identity node transmits a first preference identification response message that includes a first preference value determined based on a digital good selected by a user associated with the designated network identifier.

12. A database system implemented via a server system, the server system comprising:
a communications interface operable to receive request to present a digital content item at a client machine associated with a designated network identifier and to transmit, for each of a plurality of preference characteristics, a respective characteristic query message via a network to a respective plurality of identity nodes via a gossip communication protocol defining a peer-to-peer procedure for transmitting information among the plurality of identity nodes;
a storage system operable to store, for each of the plurality of preference characteristics, a respective preference identification response message that includes a respective preference value corresponding with the respective preference characteristic and determined based on consensus among a subset of the plurality of identity nodes, the subset of the plurality of identity nodes being in agreement about the respective preference characteristic which indicates a respective preference associated with a user linked with the designated network identifier, wherein the designated network identifier is stored in a trust ledger shared among the plurality of identity nodes; and
a processor operable to select the digital content item based at least in part on the preference values, wherein the communications interface is operable to transmit to the client machine a message including an instruction to present the digital content item.

13. The database system recited in claim 12, wherein the digital content item is selected based at least in part on publicly available transaction information stored in a public trust ledger.

14. The database system recited in claim 13, wherein the publicly available transaction information includes one or more fungible or non-fungible tokens stored in a wallet owned by a public trust ledger account associated with the designated network identifier.

15. The database system recited in claim 12, wherein the request is received at a metaverse provider, and wherein the digital content item is presented at the client machine within a virtual reality experience shared across a plurality of client machines.

16. The database system recited in claim 12, wherein the designated network identifier is associated with a plurality of identification data values and a data object schema, the data object schema identifying one or more data fields associated with an instance of the data object schema, each of the identification data values corresponding with a respective one of the data fields.

17. The database system recited in claim 16, wherein the respective one or more data values are hashed prior to storing in the trust ledger, the trust ledger capable of being queried to determine any network identifiers associated with a designated hashed data value.

18. The database system recited in claim 16, wherein the plurality of identity nodes collectively form a distributed identity network capable of validating an identity claim that includes the plurality of identification data values without divulging an origin of information used to validate the identity claim.

19. One or more non-transitory computer readable media having instructions stored thereon for performing a method, the method comprising:

receiving at a service system a request to present a digital content item at a client machine associated with a designated network identifier;

for each of a plurality of preference characteristics, transmitting a respective characteristic query message via a network to a respective plurality of identity nodes via a gossip communication protocol defining a peer-to-peer procedure for transmitting information among the plurality of identity nodes;

for each of the plurality of preference characteristics, receiving a respective preference identification response message that includes a respective preference value corresponding with the respective preference characteristic and determined based on consensus among a subset of the plurality of identity nodes, the subset of the plurality of identity nodes being in agreement about the respective preference characteristic which indicates a respective preference associated with a user linked with the designated network identifier, wherein the designated network identifier is stored in a trust ledger shared among the plurality of identity nodes;

selecting via a processor the digital content item based at least in part on the preference values; and transmitting to the client machine a message including an instruction to present the digital content item.

\* \* \* \* \*